United States Patent [19]

Suzuki et al.

[11] Patent Number: 5,094,282

[45] Date of Patent: Mar. 10, 1992

[54] LUMBER PROCESSING APPARATUS

[75] Inventors: Yukitomo Suzuki; Masayuki Kawashima; Takeshi Oguri; Takayuki Shimizu; Masakazu Honda, all of Shizuoka, Japan

[73] Assignee: Heian Corporated, Shizuoka, Japan

[21] Appl. No.: 581,822

[22] Filed: Sep. 12, 1990

[30] Foreign Application Priority Data

Jan. 25, 1990 [JP] Japan .................................. 2-15414
Apr. 16, 1990 [JP] Japan .................................. 2-99823

[51] Int. Cl.⁵ ........................... B27C 9/00; B27C 1/12; B27B 1/00
[52] U.S. Cl. ......................................... 144/356; 83/72; 83/367; 83/370; 29/563; 29/568; 144/3 R; 144/3 A; 144/242 R; 144/134 A; 144/252 R; 144/1 A
[58] Field of Search ............... 144/3 R, 3 A, 3 B, 3 C, 144/242 R, 356, 134 R, 134 A, 252 R, 1 A; 29/561, 563, 564, 568

[56] References Cited

U.S. PATENT DOCUMENTS

| | | | |
|---|---|---|---|
| 3,814,153 | 6/1974 | Schmidt | 144/134 R |
| 4,158,987 | 6/1979 | Smith | 144/134 A |
| 4,260,001 | 4/1981 | DeMuynck | 51/5 C |
| 4,512,380 | 4/1985 | Schmidt | 144/134 R |
| 4,657,452 | 4/1987 | Astigiano | 144/134 A |
| 4,944,339 | 7/1990 | Luyten | 144/134 R |
| 4,945,958 | 8/1990 | Shoda | 144/1 R |

Primary Examiner—W. Donald Bray
Attorney, Agent, or Firm—Rothwell, Figg, Ernst & Kurz

[57] ABSTRACT

A lumber processing apparatus provided with a woodworking router for cutting and processing a material to be processed into a predetermined shape by a cutting edge subjected to numerical control, includes a carriage for removing a material to be processed from a storage area and storing a processed product into the storage area, a supplying table lifter for receiving the material to be processed from the carriage, a first robot for transferring the material to be processed on the supplying table to a sending-in conveyor, a woodworking router for automatically processing the material to be processed, a conveyor for carrying the product processed by the woodworking router, a second robot for transferring the product carried by the conveyor to a carrying-out table lifter, and a control unit for controlling these systems. Thereby, this apparatus can automatically carry out all the series of operations from selection and removal of materials to be processed to sending-in and processing them into the woodworking router, carrying and carrying-out of processed products and reception of products without the need for manual operations.

9 Claims, 27 Drawing Sheets

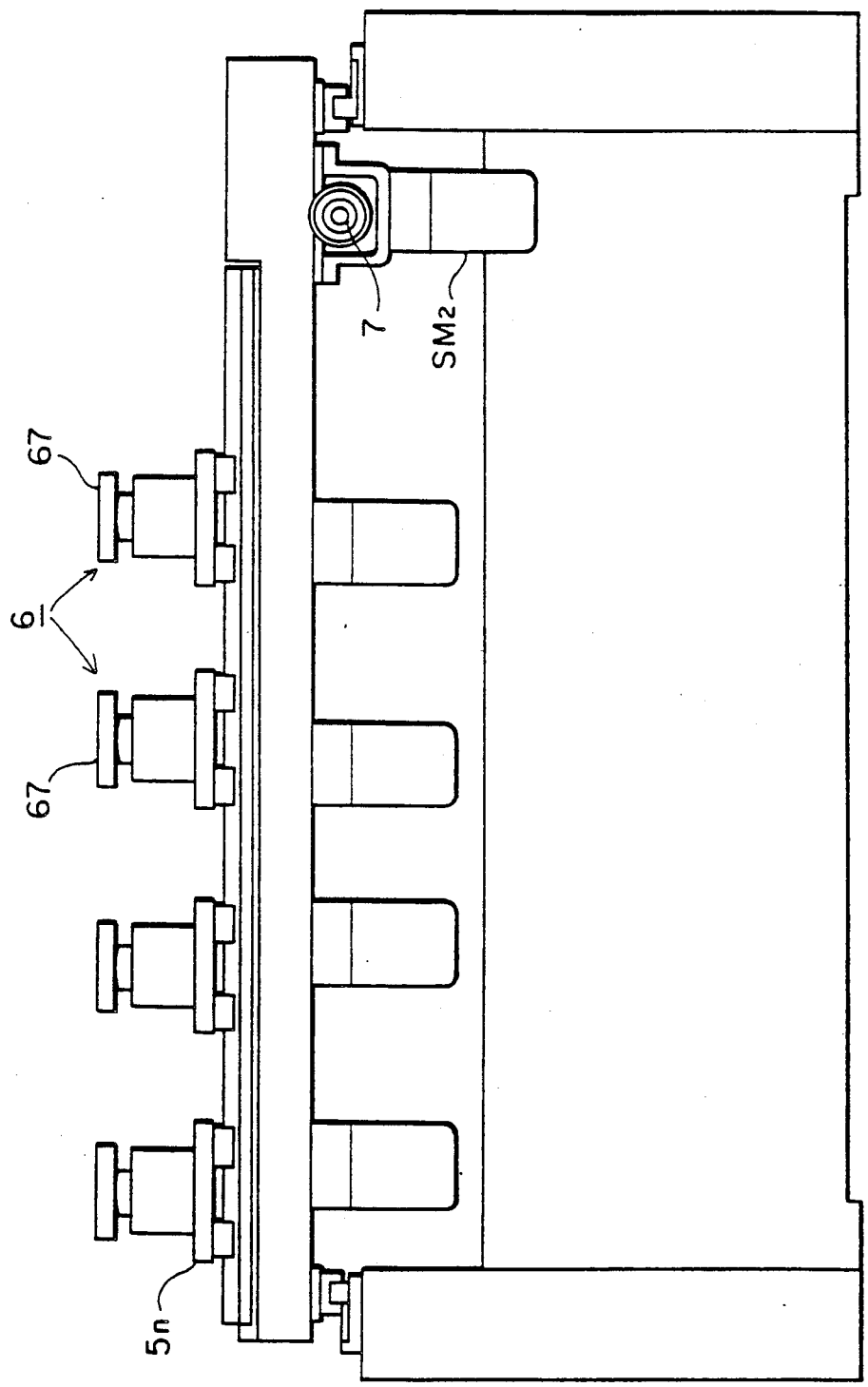

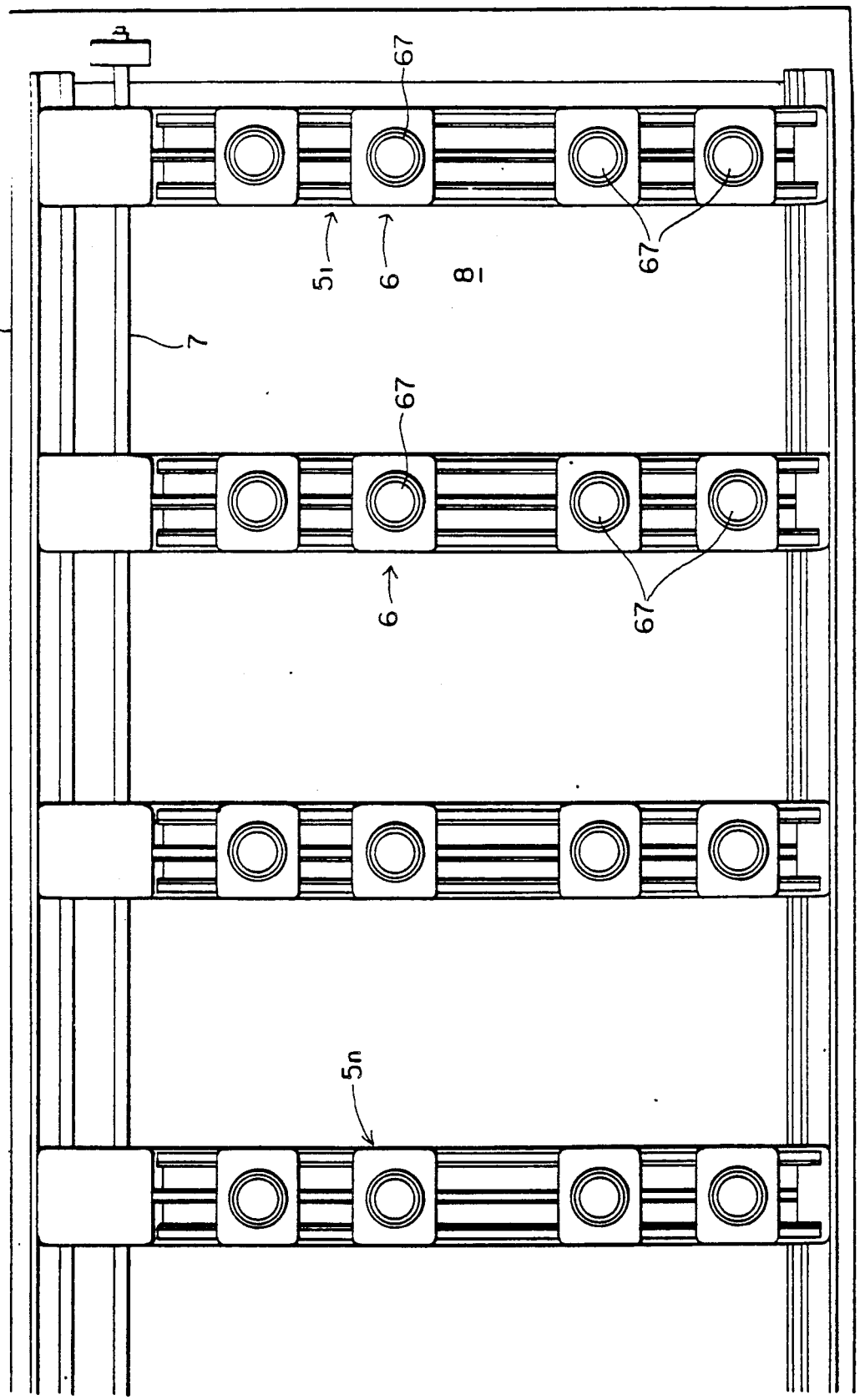

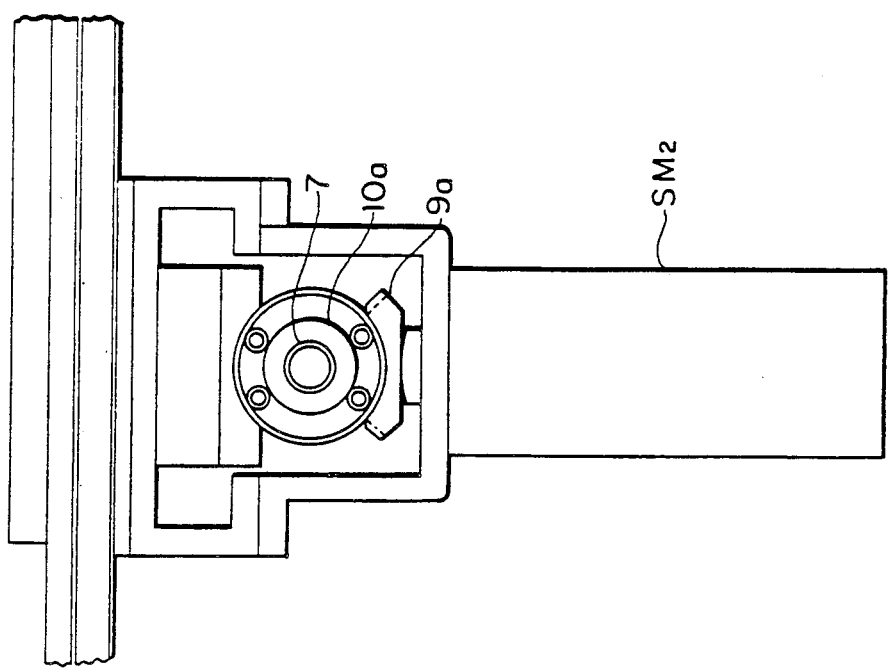
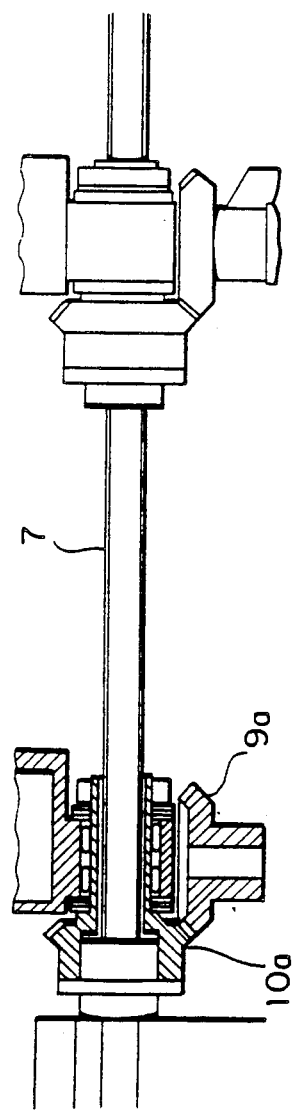
FIG. 13(A)
FIG. 13(B)

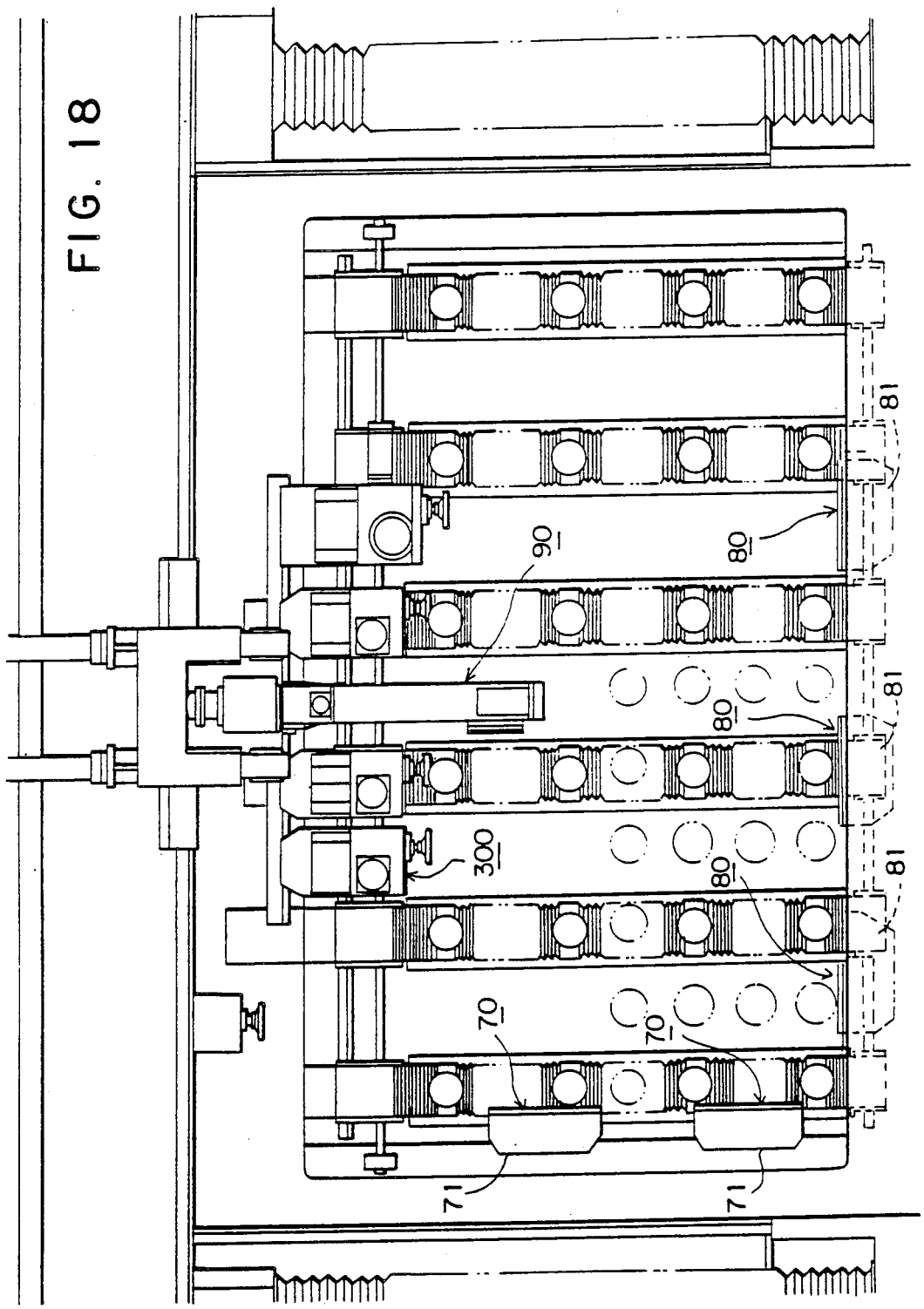

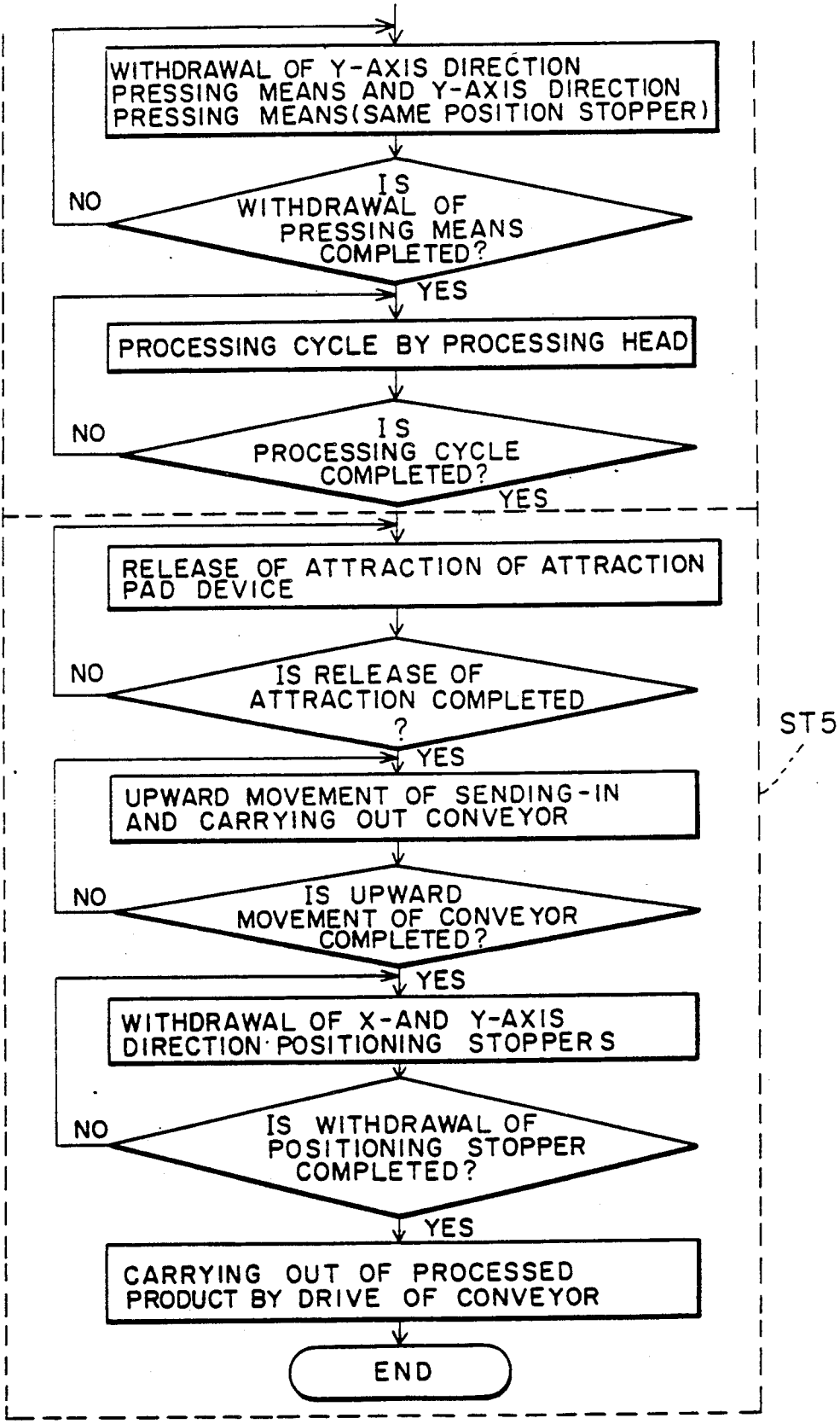

LUMBER PROCESSING APPARATUS

BACKGROUND OF THE INVENTION

1. Field the Invention

This invention relates to a lumber processing apparatus for cutting and processing a material to be processed into a predetermined shape by a numerically controlled, cutting edge, and more specifically to a lumber processing apparatus for automatically carrying out a series of steps such as removal of materials to be processed from a storage area, transfer of the materials to a processing position, processing, delivery of products after completion of processing, reception of products into a storage area, and the like.

2. Description of the Prior Art

In case of carrying out processing of lumber using a woodworking router subjected to numerical control, most operations such as selection of materials to be processed, delivery of materials to be processed from a warehouse, setting to a woodworking router, delivery of products after completion of processing and the like have been manually carried out.

In general, cutting and processing a material to be processed by a woodworking router, involves locking the material to be processed on a table. The material to be processed is so locked by vacuum force attraction as has been known.

FIG. 1 is a schematic front view of a woodworking router provided with a conventional attraction means for a material to be processed. In FIG. 1, reference numeral 1 designates a woodworking router; 2 a processing head; 3 a cutting edge; 4 a table; 100 a jig for a material to be processed; 101 a suction pump; 102 a fixing device; 103 a fixing bolt; and A a material to be processed.

The operation of the conventional woodworking router will be described hereinafter. The material to be processed A is received into the attraction jig 100 fabricated to be fitted to the shape and size of the material A. The attraction jig 100 is located at a predetermined position on the table 4 by jig clamping means, such as the fixing device 102, the fixing bolt 103 and the like, after which it is fixed. The attraction jig 100 is adapted to be connected to the suction pump 101, and the suction pump 101 is operated so that the material A is vacuum-attracted by the attraction jig 100 and fixed to a predetermined position on the table 4 through the jig 100. In this fixed state, the processing head Z is operated and the cutting edge 3 is also independently rotated and vibrated to process the material A.

Most of the operations by the conventional lumber processing are manually carried. Therefore, efficiency is poor. Particularly, in the case where a large quantity of materials is to be processed, there are involved many problems in that many operators are required, erroneous operation tends to occur, and safety management of the operation has to be taken into consideration.

In the woodworking router, in cutting and processing a material to be processed, an exclusive-use attraction jig adjusted to the shape and size of the particular material to be processed has to be fabricated whenever processing takes place for a different material type. A considerable number of fabrication steps were required. Moreover, as these attraction jigs are very poor for general use, an extensive exclusive-use space was required to store attraction jigs for each different size and shape of material to be processed. The ratio of cost of these attraction jigs to the products to be processed is large, which leads to an obstacle in achieving a reduction in cost of products to be processed. Furthermore, in cutting and processing a material to be processed, an amount of time for setting the attraction jig is required. Particularly, in a production of a variety of products in a small quantity, there has been an obstacle to improve real availability time of the apparatus.

In the case where the effective attractive force of the exclusive-use attraction jig is small, it is not possible to simply increase the attractive force in the attraction means for a material to be processed in the conventional woodworking router. Therefore, there is employed a design in which an auxiliary clamping means other than the attractive force must be used at the same time in terms of safety, requiring an extra allowance of material for clamping by the auxiliary clamping means in an end of the material to be processed.

SUMMARY OF THE INVENTION

This invention has been accomplished in view of the actual circumstances as described above. It is a first object of this invention to provide a systematized lumber processing apparatus which can automatically carry out a series of operations from the selection of materials to be processed to delivery and reception of products.

It is a second object to provide a method and apparatus for processing a material to be processed in a systematized manner for automatically locating a material to be processed at a predetermined position in a processing space according to the size and shape of a material to be processed without separately requiring an exclusive-use attraction jig, fixing the material to the predetermined position and capable of automatically carrying out the delivery of processed products and the like It is a third object of this invention to provide a method and apparatus for a material to be processed which renders a variable effective attractive force to a material to be processed so as to be able to obtain an optimum attractive force in advance, and which can economically obtain materials without requiring an auxiliary clamping means and without requiring a clamping allowance for the material to be processed.

For achieving the above-described first object, this invention comprises a carriage for removing materials to be processed from a storage area and receiving processed products into the storage area, a supplying table lifter for receiving materials to be processed from said carriage a first robot for transferring a material to be processed on said supplying table lifter to a sending-in conveyor, a conveyor for carrying out products processed by a woodworking router, a second robot for transferring products carried out by said conveyor to a carrying-out table lifter, and a control unit for controlling these systems.

That is, when the carrier removes a designated material to be processed from the storage area to carry it on the supplying table lifter, the first robot holds the material to put it on the sending-in conveyor. The sending-in conveyor sends the material to be processed onto the table of the woodworking router, and after the material to be processed has been positioned, the material is subjected to cutting and processing by way of numerical control. When the product processed into a predetermined shape is carried by the conveyor to a predetermined position, the second robot holds the product to transfer it onto the carrying out table lifter The carriage receives the product on the carrying-out table lifter to store it in a designated location in the storage area. A series of these operations are all automatically carried out under the control of the control unit.

For achieving the above-described second and third objects, according to this invention, there are provided a method and apparatus for processing a material to be processed including a first step wherein a sending-in and carrying-out conveyor having an oscillating support point is provided within a body of a woodworking router, a carrier surface is made possible to be moved in and out of a processing space of the woodworking router by vertical oscillation of the sending-in and carrying-out conveyor about the oscillating support point, and a material to be processed is sent into the processing space in the state where the carrier surface is moved into the processing space; a second step of providing a plurality of attraction pad devices disposed movably in a direction of the X-axis and in a direction of the Y-axis of the plane of said processing space to substantially form a place surface of said material to be processed, said attraction pad devices attracting and fixing said material to be processed, moving said sending-in and carrying-out conveyor onto said attraction pad devices to withdraw the material from the processing space, and placing the material to be processed on the conveyor on the attraction pad devices during the downward movement thereof; a third step wherein there are provided a positioning stopper capable of being moved in and out in the vicinity of ends in said processing space orthogonal to the X-axis and Y-axis directions of the plane and positioning means disposed at a position substantially opposed to the position at which said stopper is moved in and out and capable of appearing on or withdrawing from said processing space, said positioning means being moved upward and to appear in the vicinity of lower ends of two adjacent sides of the processing space, the material to be processed being pressed against the positioning stopper by pressing means corresponding to each other; a fourth step wherein said material to be processed is attracted and fixed by said attraction pad devices, after which said positioning stopper and said pressing means are withdrawn from the processing space to effect processing; and a fifth step of confirming termination of processing, releasing the attraction by said attraction pad devices and thereafter moving said sending-in and carrying-out conveyor upward to carry out the product, wherein there is provided a control device for collectively controlling the operation of said sending-in and carrying-out conveyor, said attraction pad devices, said positioning stopper, said pressing means and the like to automatically carry out the steps from the first to fifth steps.

In the method and apparatus for processing the material to be processed in the lumber processing apparatus according to this invention, the sending-in and carrying-out conveyor is moved upward so that the carrier surface thereof reaches the processing space to thereby send the material to be processed out of the apparatus into the processing space. The attraction pad devices substantially constituting the placing surface of the material to be processed are moved in the direction of the X-axis and the Y-axis in advance to form a scattering or gathering state. The materials to be processed sent into the processing space are placed on the attraction pad devices by the downward movement of the sending-in and carrying-out conveyor. The sending-in and carrying-out conveyor further continues moving downward and out of the processing space. The positioning means in the processing space is operated to position the material to be processed, and the attraction pad devices are operated to fix the material to be processed at the position determined by the positioning means. When the operation of the positioning means is released to withdraw it from the processing space, only the material to be processed is present in the processing space whereby no obstacle is present, to thus allow processing of the material to be processed to be easily executed. Upon termination of processing, the attraction pad devices are released, and the thus-released processed product is picked up by the upward moving sending-in and carrying-out conveyor and carried outside the processing space by the conveyor being driven. Since the operations of the processing head, the sending-in and carrying-out conveyor, the attraction pad devices, the positioning device and the like are collectively controlled, therefore, the processing of the material to be processed can be automatically executed.

The above and other objects and novel features of the present invention will become more completely understood from the ensuing detailed description in conjunction with the accompanying drawings. However, the drawings are provided merely for interpretation and do not limit the scope of this invention.

BRIEF DESCRIPTION OF THE DRAWINGS

FIG. 11 is a side view of the same;

FIG. 12 is a plan view of the same;

FIGS. 13A and 13B and FIGS. 14A and 14B are respectively sectional views showing essential parts of the attraction pad device for material to be processed;

FIGS. 18 to 20 are respectively a plan view and a side view of the aforesaid woodworking router showing a positioning device for material to be processed;

DETAILED DESCRIPTION OF THE PREFERRED EMBODIMENTS

Preferred embodiments of this invention will be described in detail with reference to the accompanying drawings.

Figure 1:
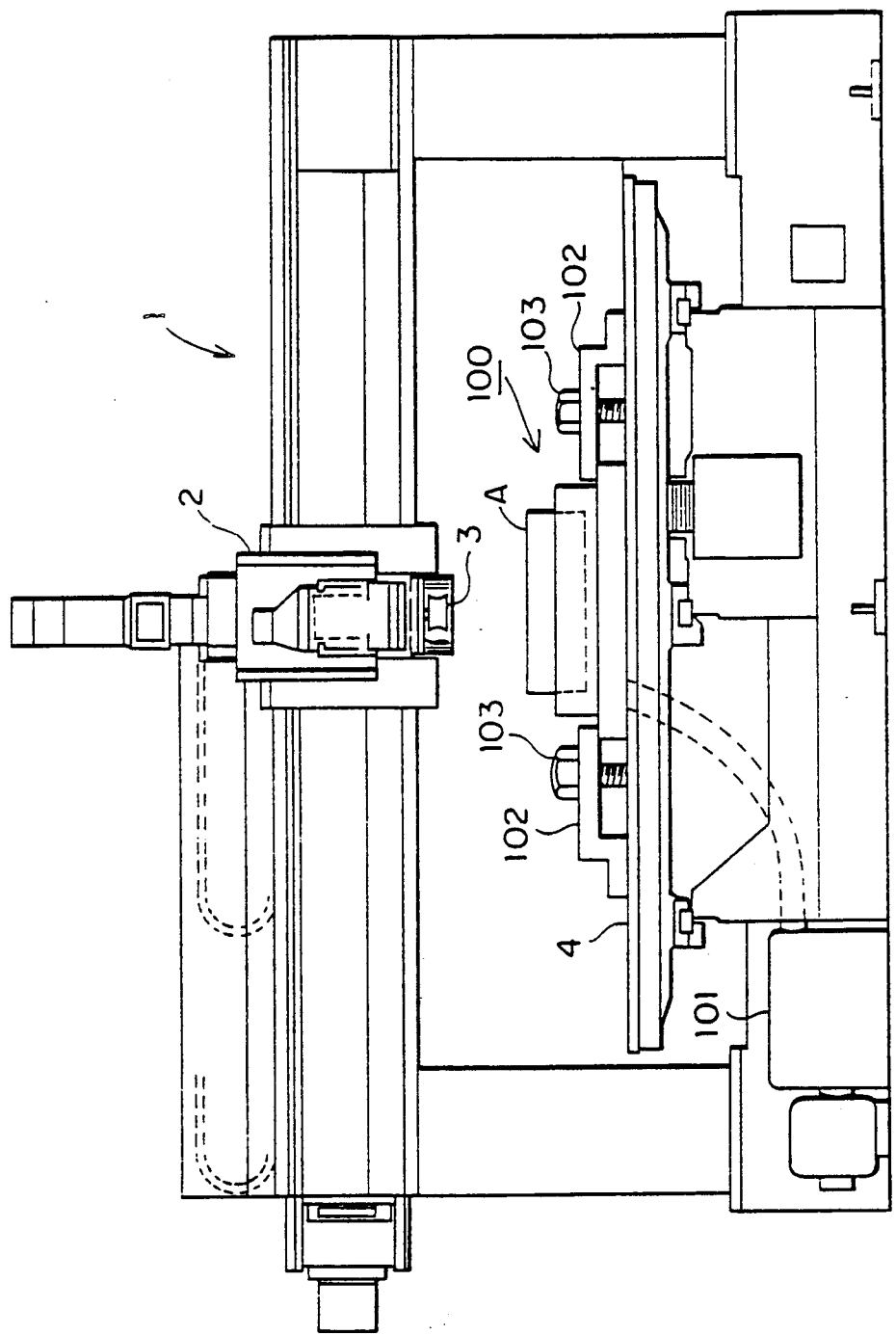
FIG. 1 is a schematic illustration showing a conventional lumber processing apparatus.
Figure 2:
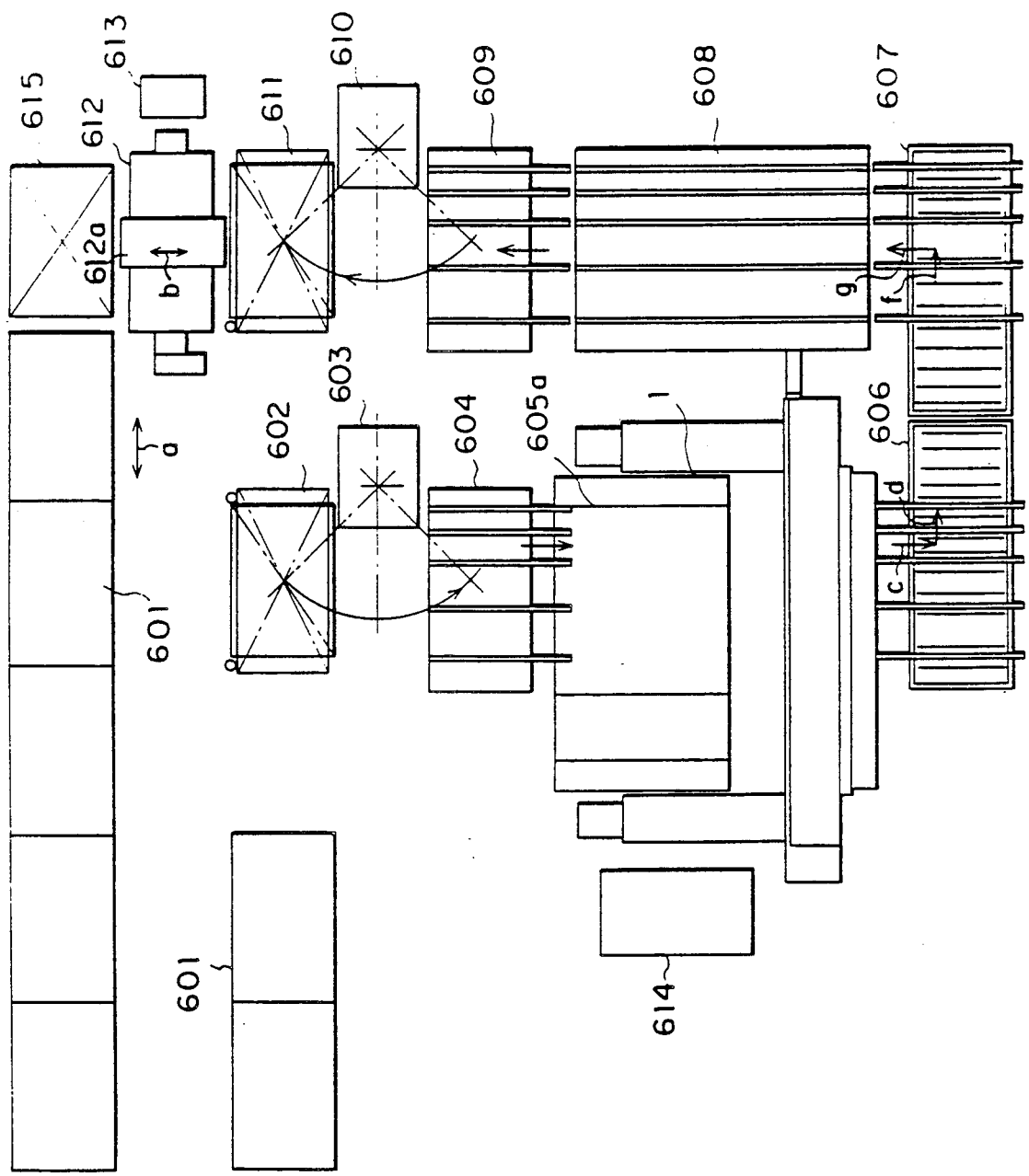
FIG. 2 is a plan view showing a lumber processing apparatus according to one embodiment of this invention.
Figure 3:
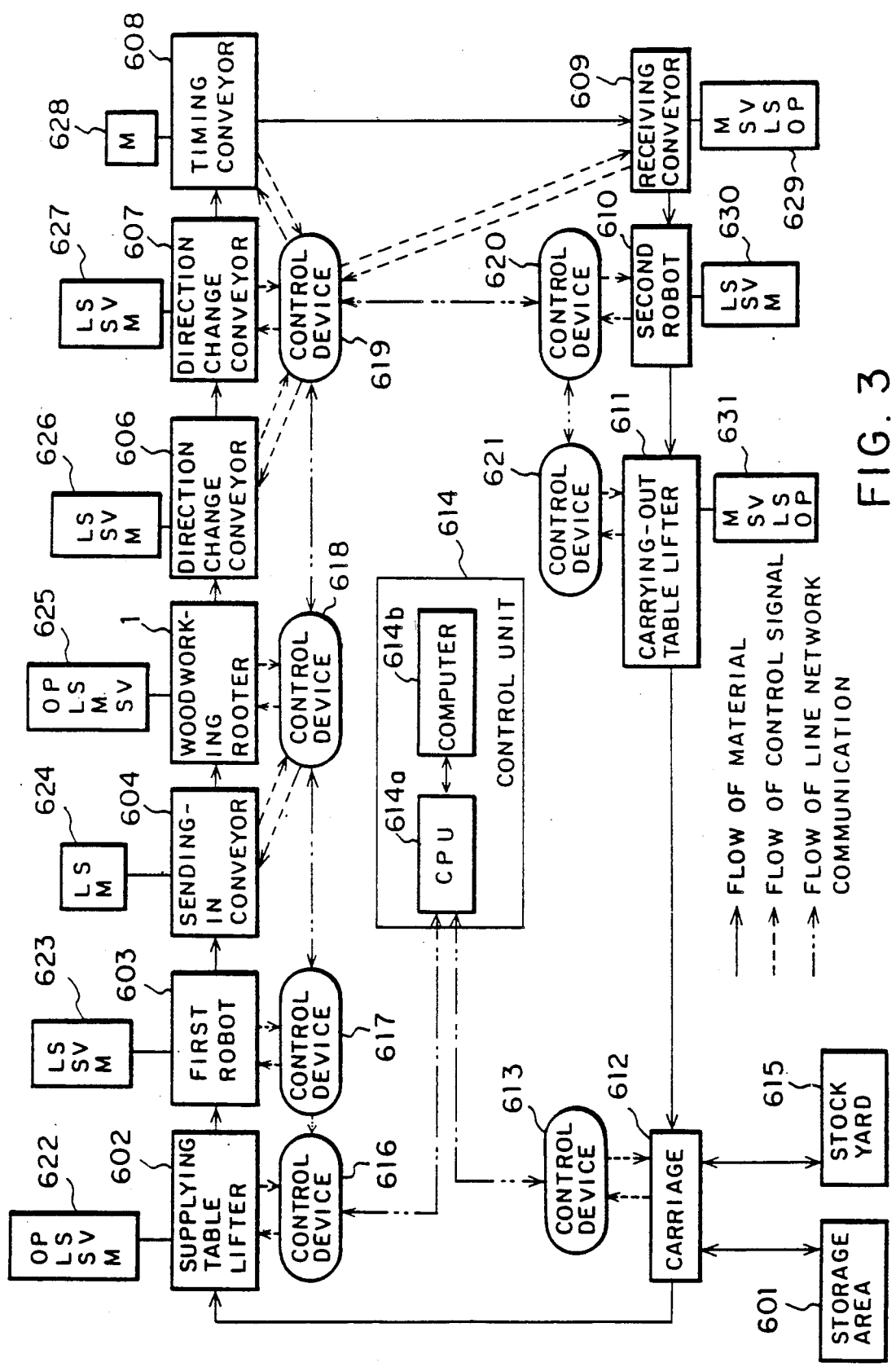
FIG. 3 is a block diagram of the apparatus.
Figure 4:
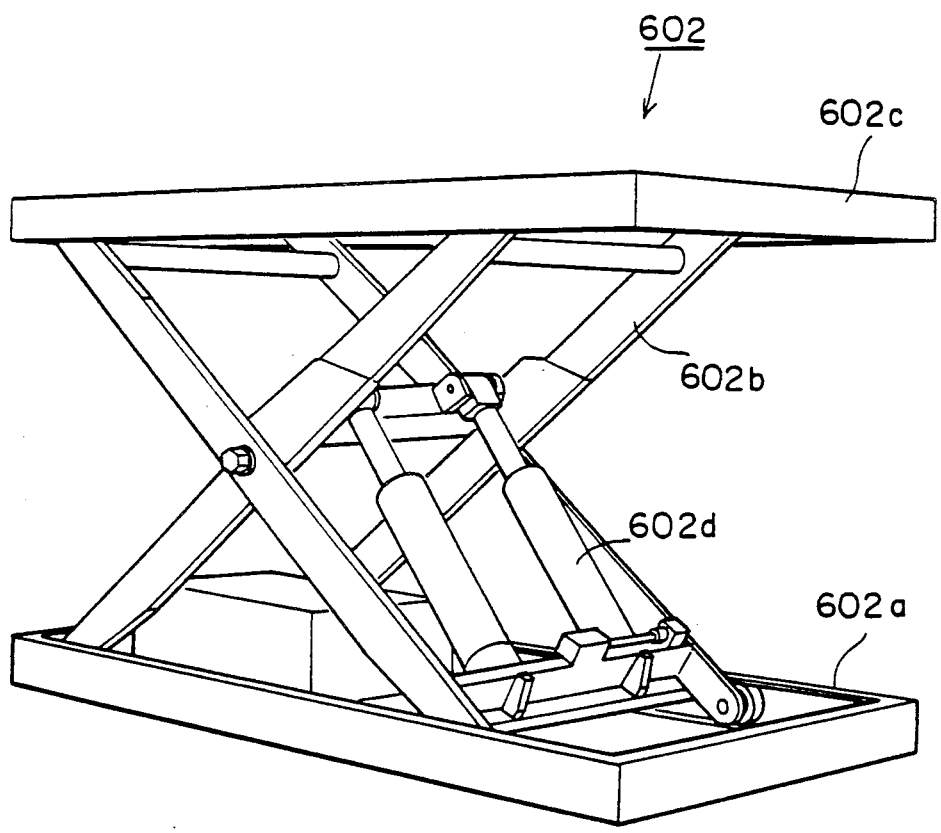
FIG. 4 is a perspective view of a supplying table lifter in the apparatus.

Referring to FIGS. 2 and 3, reference numeral 601 designates a storage area for storing materials to be processed and processed products. The storage area 601 has a number of shelves provided in plural stages and plural rows, in which materials to be processed and products with numbers and codes attached thereto are stored. Reference numeral 615 designates a stockyard for sending-in and carrying out materials, which is provided to store the products from or in addition to the storage area 601. The stock yard 615 is arranged adjacent to the storage area 601. Reference numeral 612 designates a carriage, which is reciprocated in a direction as indicated by arrow to remove a designated material to be processed form the storage area 601 and to place it on a supplying table lifter 602, described later, and which receives a product from a carrying-out table lifter 611, described later to store it in a designated place of the storage area 601 or the stock yard 615. This carriage 612 is provided with an arm 612a for delivering materials to be processed or products, the arm 612a capable of being moved upward and downward and being movable in a lateral direction as indicated at arrow b. Reference numeral 613 designates a control device for controlling the carriage 612. Reference numeral 602 designates a supplying table lifter on which is placed a material to be processed carried by the carriage 612. The supplying table lifter 602 is designed so that as shown in FIG. 4, a table 602c is provided on a base 602a and is movable upwardly and downwardly through a lifting mechanism 602b and there is provided a hydraulic driving device 602d for driving the lifting mechanism 602b.

Figure 5:
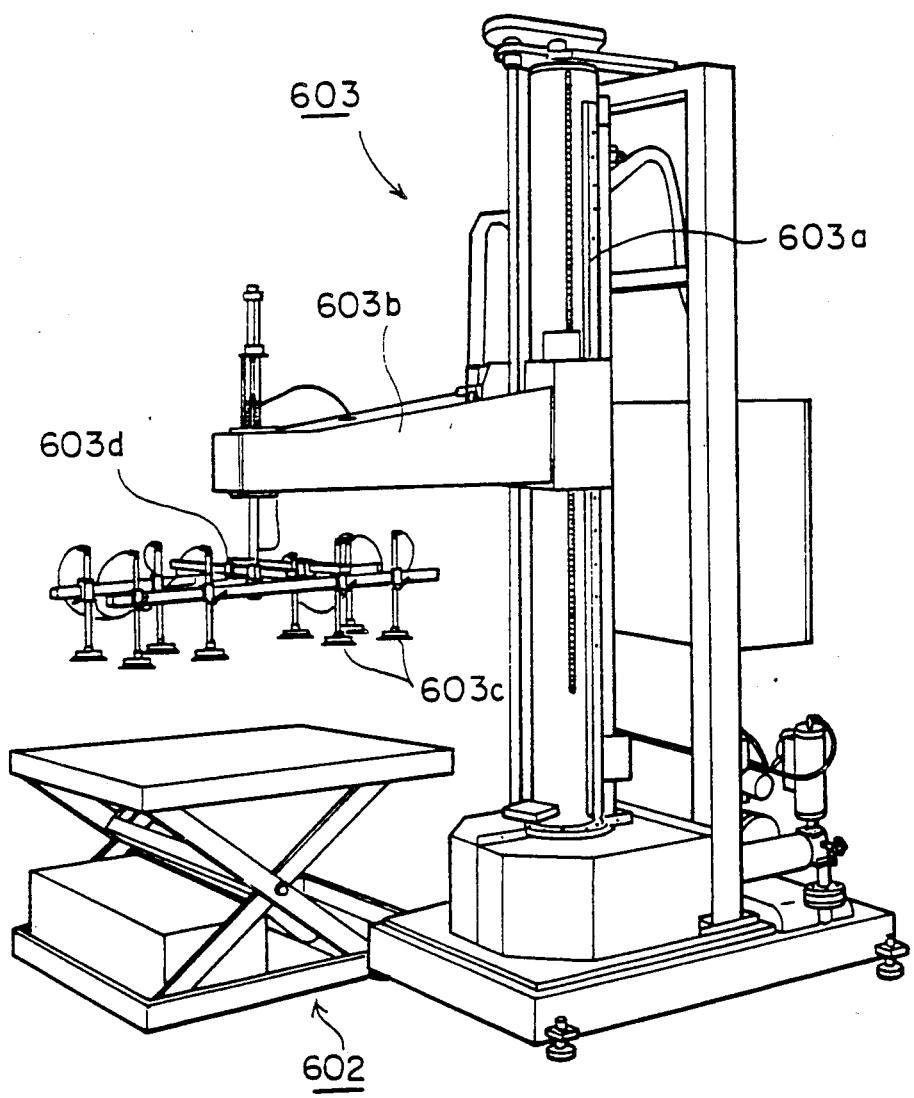
FIG. 5 is a perspective view of a robot in the apparatus.

Reference numeral 603 designates a first robot, and 604 a conveyor for sending-in a material to be processed. The first robot 603 is provided to grab and hold a material to be processed from the supplying table lifter 602 to transfer it to sending-in conveyor 604. The first robot 603 is designed so that an arm 603b is horizontally movably provided on a body 603a, and a holding portion 603d having a plurality of attraction pads 603c is provided on the extreme end of the arm 603b, as shown in FIG. 5.

Figure 6:
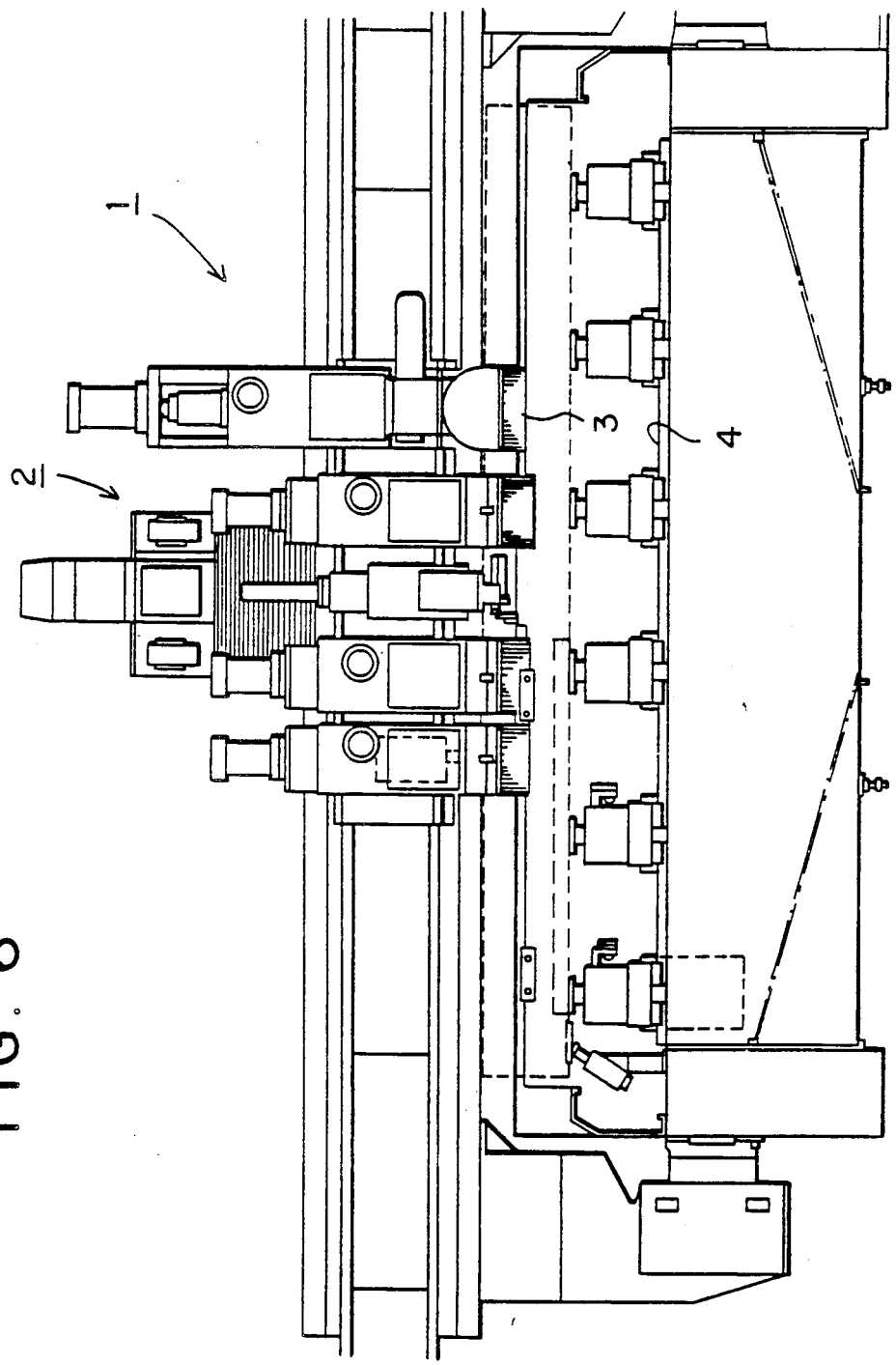
FIG. 6 is a front view of a woodworking router in the apparatus.

Referring to FIGS. 2, 3, and 6, reference numeral 1 designates a woodworking router in which a material to be processed is sent in from the sending-in conveyor 604, comprising a table 4 with a conveyor for carrying a material on which a material to be processed is positioned and placed and a head 2 having a cutting edge 3 mounted thereon, as shown in FIG. 6.

Figure 7A:
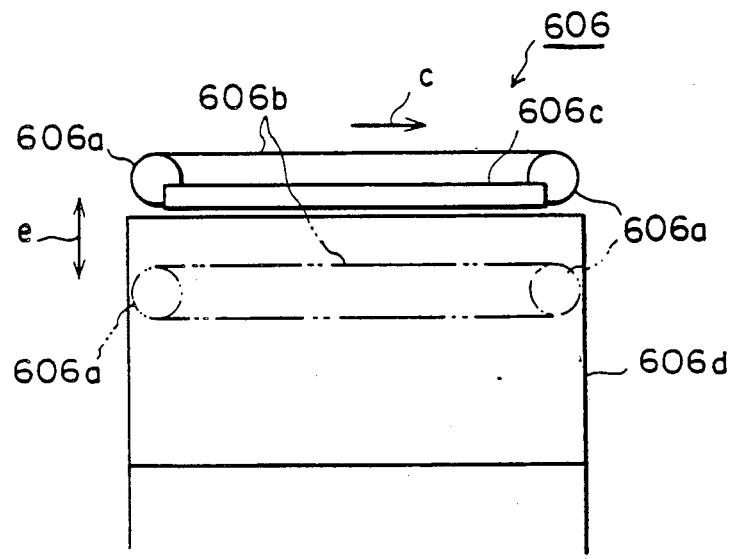
FIGS. 7A and 7B are respectively a side view and a front view showing a direction change conveyor in the apparatus.
Figure 7B:
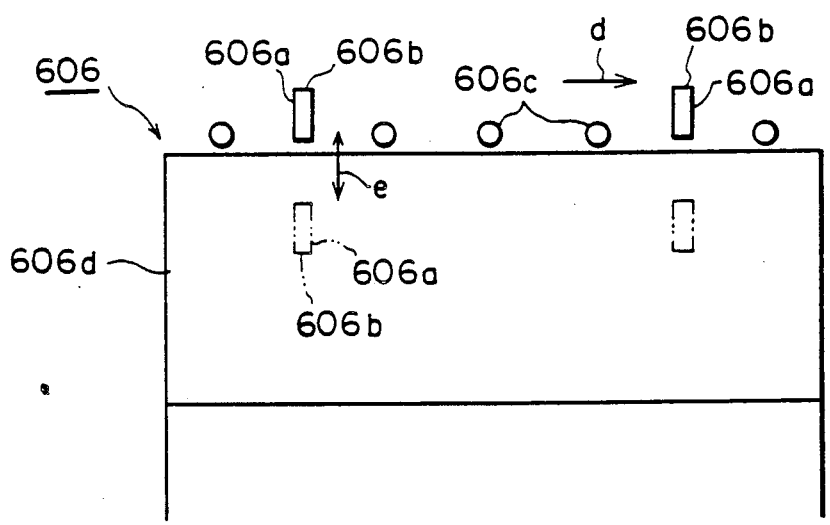

Reference numeral 606 designates a direction change conveyor, which changes the direction of the product processed by the woodworking router 1 orthogonally from direction c to direction d to carry it to a second conveyor 607 described later. The direction change conveyor 606 is provided with a plurality of belts 606b supported on driving rollers 606a and movable in a direction indicated at arrow c, and a plurality of rollers 606c being provided on a base 606d, as shown in FIGS. 7A and 7B, said belts 606b and said rollers 606a capable of being moved up and down in a direction as indicated at arrow e.

Reference numeral 607 designates a second direction change conveyor, which changes the direction of the material to be processed from the direction change conveyor 606 to the orthogonal direction as indicated by arrows f and g, the conveyor 607 having substantially the same structure as conveyor 606. Reference numeral 608 designates a timing conveyor, which further carries the material to be processed from the direction change conveyor 607. Reference numeral 609 designates a receiving conveyor, which receives the material to be processed from the timing conveyor 608. Reference numeral 610 designates a second robot having the same structure as robot 603, and 611 a carrying-out table lifter. This second robot 610 grabs and holds the material to be processed from the receiving conveyor 609 to transfer it onto the carrying-out table lifter 611. The carrying-out table lifter 611 has the same structure as that of the supplying table lifter 602.

Reference numeral 614 designates a control unit for controlling the elements 602, 603 . . . 611, the control unit 614 comprising a CPU 614a and a computer 614b.

Referring now to FIG. 3, reference numerals 616, 617 . . . 621 designate control devices, which control the elements 602, 603 . . . 611 in accordance with the control of the control unit 614. Among them, the control device 618 controls in common the sending-in conveyor 604 and the woodworking router 1, and the control device 619 controls in common the direction change conveyors 606 and 607, the timing conveyor 608 and the receiving conveyor 609. Reference numerals 622, 623 . . . 631 designate driving portions for driving the elements 602, 603 . . . 611 The driving portions 622, 623 . . . 631 are variously provided with all or some of a position detecting photoelectric detector OP, a limit switch LS, a driving solenoid valve SV and a motor M.

Next, the procedure for processing the material to be processed by use of the lumber processing apparatus constructed as described above will be described hereinafter.

In FIG. 3, the arrows indicated by the solid line designate the flow of the material to be processed and the product, the arrows indicated by the broken line designate the flow of the control signals between the control devices 613, 616, 617 . . . 621 and their control objects, and the arrows indicated by the dash-dotted contour line designate the flow of the line network communication signals between the control devices 613, 616, 617 . . . 621.

(1) By use of the computer 614b of the control unit 614, a schedule of the number and kind of materials to be processed, stocking location, order of processing and the like is prepared.

(2) When the operation is started, the carriage 612 first moves and stops in front of a shelf having the first scheduled shelf number of the storage area 601.

(3) The arm 612a moves vertically and laterally to remove a pallet with a predetermined material to be processed from the shelf, and the carriage 612 again moves.

(4) The carriage 612 stops in front of the supplying table lifter 602 to unload the pallet on the supplying table lifter 602.

(5) At the same time, the sending-in conveyor 604 is started and stands-by, and the carriage 612 places an empty pallet on the carrying-out table lifter 611.

(6) Next, the first robot 603 is actuated so that its arm 603b (see FIG. 4) rotates and the material to be processed on the supplying table lifter 602 is grabbed and held by the attraction pad 603c, rotated and released on the sending-in conveyor 604.

(7) The material on the sending-in conveyor 604 is carried onto the table 4 (see FIG. 6) of the woodworking router 1.

(8) The material to be processed is positioned on the table 4. This positioning method comprises, for example, forcing the material to be processed in contact with the X- and Y-direction positioning stopper provided on the table 4, and thereafter vacuum-locking it in position by the plurality of attraction pads. The details will be described later.

(9) The material positioned on the table 4 is cut and processed in a programmed order by the cutting edge 3 provided on the head Z subjected to numerical control.

(10) The product processed into a predetermined shape is transferred from the table 4 to the direction change conveyor 606 by a transfer means such as a conveyor. The material is further carried by the direction change conveyor 607 and the timing conveyor 608 and is then received by the receiving conveyor 609.

The direction change conveyor 606 changes the carrying direction of the product from direction c to the orthogonal direction d. As shown in FIG. 7, in the case where the product is carried in the direction of arrow c, the roller 606a and the belt 606b are at a position indicated by the solid line, and the product is carried by the roller 606a and the belt 606b. In the case where the product is carried in a direction of arrow b, the roller 606a and the belt 606b are moved downward to a position indicated by the dash-dotted contour line, and the roller 606c rotates to carry the product. The direction change conveyor 607 also performs the operation similar to that of the direction change conveyor 606 whereby the carrying direction of the product is changed from the arrow f to the orthogonal direction of arrow g.

(11) Next, the second robot 610 is actuated to grab and hold the product on the receiving conveyor 609 and place it on the empty pallet on the carrying-out table lifter 611.

(12) The pallet with the product placed thereon is received by the arm 612a of the carriage 612, and the product is then stored on the designated shelf of the storage area 601 or the stock yard 615. Thereafter, the operation returns to the aforesaid step (2), and the procedure is repeated.

It is noted that a plurality of materials to be processed may be stacked on the table 602c of the supplying table lifter 602, and the materials may be transferred in order by the first robot 603 to the sending-in conveyor 604. In this case, when one of the materials to be processed is placed on the table 602c of the supplying table lifter 602 the table 602c moves downwardly by that portion, by the lifting mechanism 602b driven by the drive device 602d, whereas when one of the materials to be processed is removed, the table 602c moves upwardly by that portion. Thereby, the uppermost material to be processed always assumes the same height position relative to the base. In the case where the height of the arm 603b of the first robot 603 is constant, if the uppermost material to be processed is always at the same height, it can be grabbed and held by the attraction pad 603c without any trouble.

Alternatively, a plurality of products may be stacked in order on the table of the carrying-out table lifter 611 by the second robot 610 so that the carriage 612 carries it out. Also in this case, the aforesaid table may be moved upwardly and downwardly so that the uppermost product may always assume the same height similarly to the supplying table lifter 602. Therefore, even if the height of the arm of the second robot 610 is constant, the product can be grabbed and held without any trouble.

As described above, there is provided an arrangement comprising a carriage for removing materials to be processed from a storage area and receiving processed products into the storage area, a supplying table lifter for receiving materials to be processed from said carriage, a first robot for transferring a material to be processed from said supplying table lifter to a sending-in conveyor, a conveyor for carrying out products processed by a woodworking router, a second robot for transferring products carried out by said conveyor to a carrying out table lifter, and a control unit for controlling these systems. Therefore, a series of operations from selection and removal of the materials to be processed to sending-in and processing by the woodworking router, carrying and carrying-out of processed products and storage of the products are automatically carried out.

Next, the automatic processing method of the wood working router and apparatus therefor will be described in detail.

Figure 8:
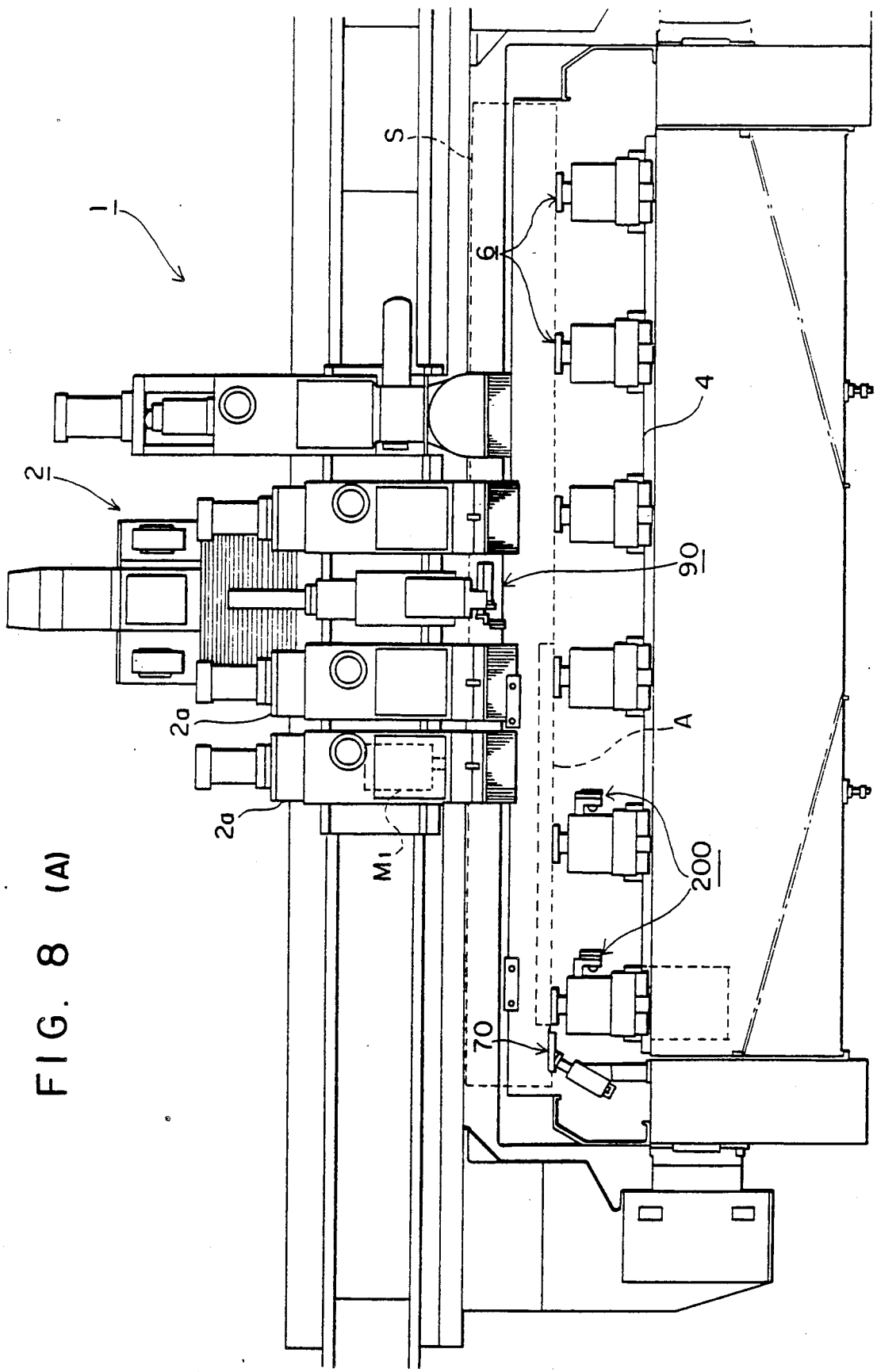
FIGS. 8A and 8B are respectively a front view of a working router according to one embodiment of this invention and a perspective view of its processing unit.
Figure 8:
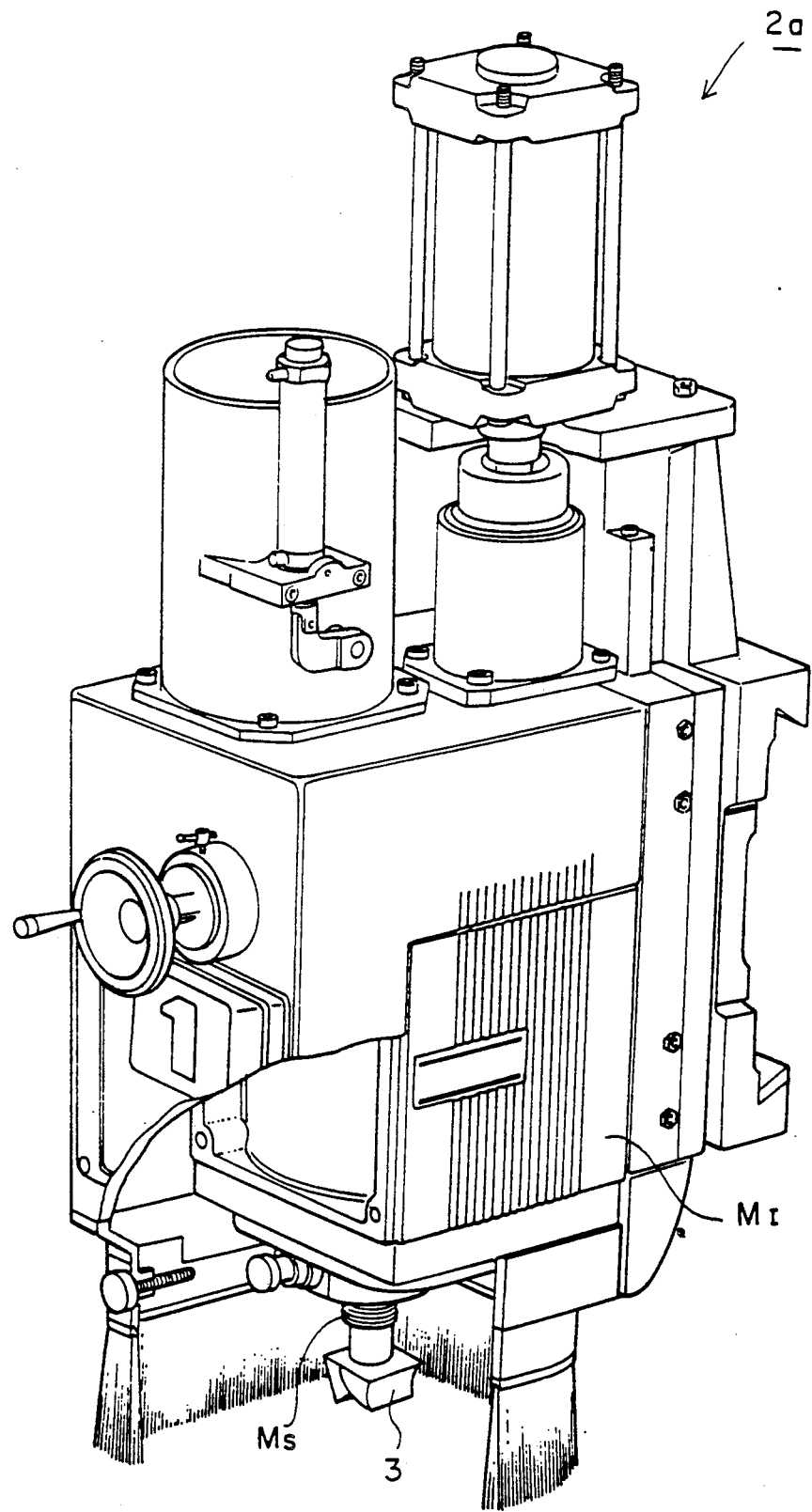

FIG. 8A is a front view of a woodworking router, and FIG. 8B is a perspective view of a processing unit thereof. In these figures, reference numeral 1 designates a woodworking router, S a processing space, and 2 a head of the woodworking router 1. A plurality of processing units 2a are mounted on the head, the processing units 2a each being provided with a spindle MS rotated and driven by a motor $M_1$, and a cutting edge 3 detachably mounted at the lower end of the spindle MS. Similarly to the case of the conventional woodworking router 1, the head 2 is vertically driven by numerical control (NC) and driven in the X-Y direction of the processing space plane. Reference numeral 200 designates a sending-in and carrying-out conveyor, one end of which is supported to be oscillated within the body of the woodworking router 1. The other end of the conveyor 200 can be moved vertically. When the conveyor 200 moves upward to the top dead center, the carrier surface of the conveyor 200 assumes a position within the processing space S, and the conveyor 200 is driven to render possible the sending-in of the material A to be processed into the processing space S and the carrying-out of the processed product from the processing space S. Reference numeral 6 designates an attraction pad device, the upper end of which substantially constitutes a place surface of the material to be processed A. Since the attraction pad device 6 is movable in the X- and y-axis directions of the plane of the processing space S, positions of individual devices 6 are selected and controlled in advance so that the optimum attractive force may be obtained according to the shape and size of the material to be processed A.

Reference numeral 70 designates a X-axis direction positioning stopper, which together with an Y axis direction positioning stopper 80 (see FIGS. 18 and 20), is moved in and out of the processing space S, and in positioning, appears in the processing space S to form a reference surface and comes into contact with the incoming material to be processed A to stop the latter. Reference numeral 90 designates an X-axis direction pressing means, which is disposed at an approximately opposed position of the X-axis direction positioning stopper 70. The pressing means 90 can be inserted and/or withdrawn from the processing space S together with the Y-axis direction pressing means 300 arranged similarly with respect to the Y-axis direction stopper 80. In positioning of the material to be processed A, the material to be processed A is pressed in the direction of the positioning stopper 70 for positioning.

Figure 9:
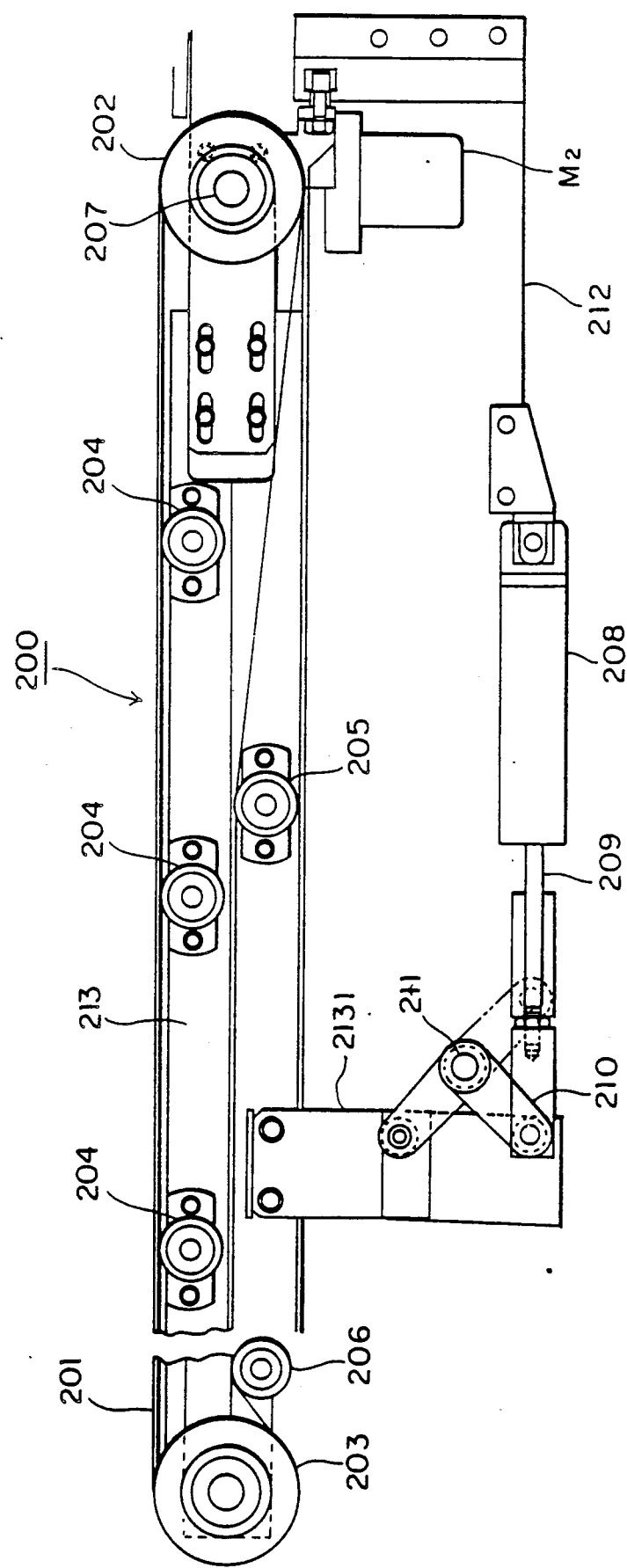
FIG. 9 is a side view of a sending-in and carrying out conveyor.

FIG. 9 is a side view showing the sending-in and carrying-out conveyor. In this figure, reference numeral 200 designates the sending-in and carrying-out conveyor, 201 a conveyor belt, 202 a driving roller, 203 a driven roller, 204 a holding roller, 205 and 206 tension rollers, and 207 a driving shaft. The driving shaft 207 is integrally coupled to the driving roller by means of an engaging member such as a key member (not shown) to transmit its own rotative driving force to the roller 202, and the driving shaft 207 is rotatably supported on a supporting plate 212. Reference numeral 208 designates a pneumatic cylinder, 209 a cylinder rod, 210 an actuator, and 211 a rotational support shaft of the actuator 210, the support shaft 211 being fixedly mounted on the supporting plate 212. Reference numeral 213 designates a conveyor stay, and $M_2$ a reversible conveyor driving motor, which transmits a rotative driving force reduced through a group of gears (not shown) to the driving shaft 207.

The operation will now be described. A circular cam is rotatably supported on one end of the actuator 210 and is movably engaged with a cam groove of a coupling element 2131 fixedly mounted on the conveyor stay 213. The other end of the actuator 210 is rotatably supported within the same plane as the axial direction of the cylinder rod 209, to the end of the cylinder rod 209 of the pneumatic cylinder 208 through the coupling portion. Since the actuator 210 is rotatably supported in its approximately central portion on the surface of the supporting plate 212 by the rotational support shaft 211 as described above, when the pneumatic cylinder 208 is actuated to allow the cylinder rod 209 to effect piston motion, the horizontal piston motion of the cylinder rod 209 is converted into the vertical motion of the coupling element 2131 by the actuator 210. The conveyor belt 201 comprises an endless belt wound around the drive rollers 202, the driven roller 203 and the holding roller 204, and the tension of the conveyor belt 201 is adjusted by the tension rollers 205 and 206. When the carrier surface of the conveyor belt 201 rises so that the carrier surface may pass through the processing space S, the send-in and carrying-out conveyor 200 causes the conveyor driving motor $M_2$ to be reversed for the sending-in or carrying out. The supporting plate 212 is secured to the pad mounting unit of the attraction pad device described later and moves as the unit is moved in the X-axis direction.

Figure 10:
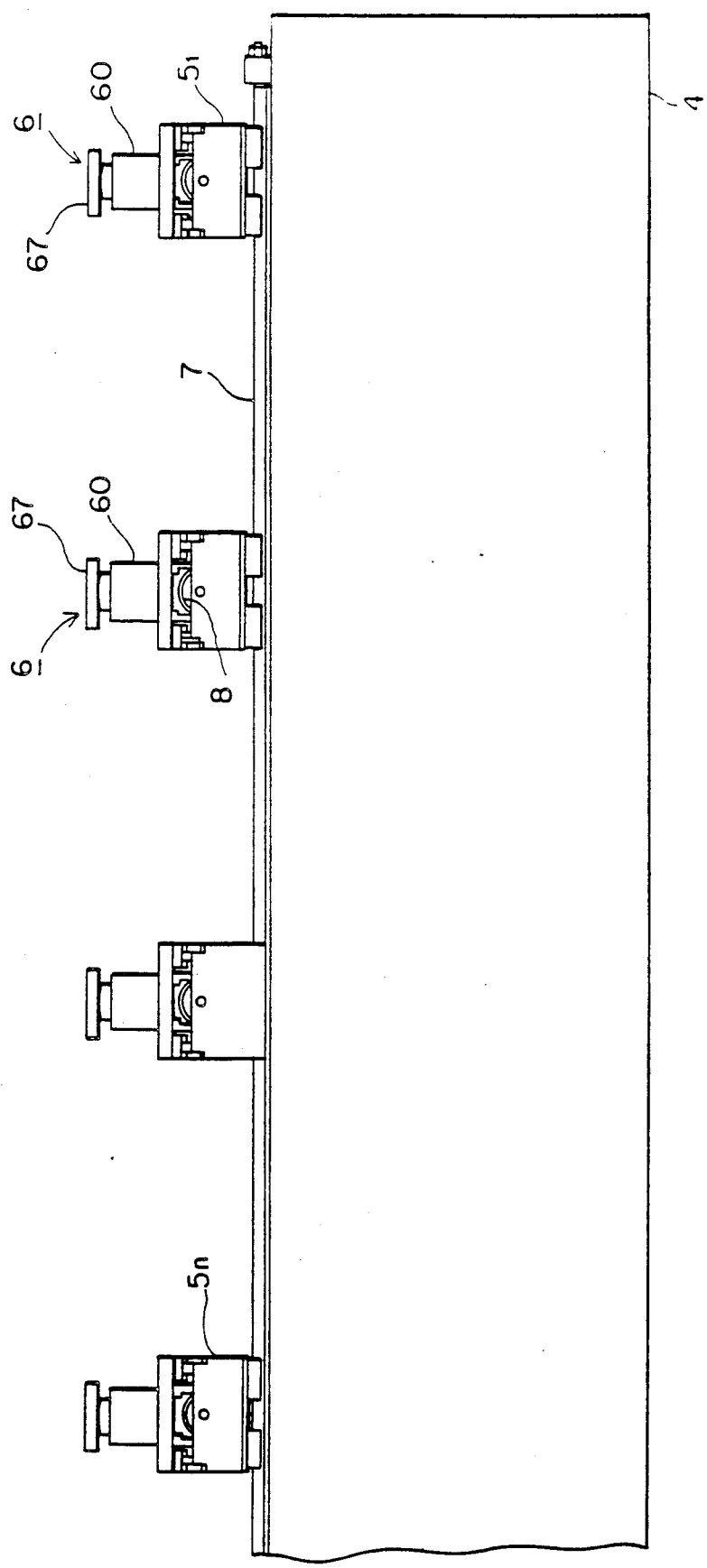
FIG. 10 is a front view of an attraction pad device for a material to be processed of said woodworking router.

FIG. 10 is a front view showing a material-to be processed attraction pad device of the lumber processing apparatus, FIG. 11 is a side view of the same, FIG. 12 is a plan view of the same, and FIG. 13 is a sectional view showing essential parts of the attraction pad device.

The woodworking router 1 is provided with the processing space S for processing the material to be processed A. A table 4 is disposed in the vicinity of the bottom of the processing space S, and a plurality of pad mounting units $5_1$ to $5_n$ are arranged in parallel as shown in FIGS. 10 to 12 upwardly of the table 4. A plurality of attraction pad devices 6 are mounted movably in the Y-axis direction on the pad mounting units $5_1$ to $5_n$. That is, the pad mounting units $5_1$ to $5_n$ are each threadedly engaged with an X-axis direction screw rod (unit guide means) mounted on the table 4 and supported to be reciprocated in the X-axis direction along the screw rod 7.

The construction of the attraction pad devices 6 will be described in detail with reference to FIG. 14 The attraction pad device 6 is provided with a pad supporting cylinder 60 having a lower end threadedly engaged with a Y-axis direction screw rod 8. The pad supporting cylinder 60 is provided, from an upper portion of a peripheral wall toward a lower portion of the peripheral wall thereof, with a fluid supply port 61 for moving the pad downward, a fluid supply port 62 for moving the pad upward and a suction port 63 in said order.

The fluid supply port for moving the pad 61 downward and the fluid supply port 62 for moving the pad 62 downward are connected to a pressure fluid (air) supply source through an electromagnetic switching valve or the like. The suction port 63 is connected to a vacuum suction source such as a vacuum suction pump.

A pad supporting rod 64 is vertically movably inserted into the pad supporting cylinder 60, the pad supporting rod 64 having its upper end projected from an upper end of the pad supporting cylinder 60. An annular pressure receiving projection 65 is formed integral with an outer peripheral surface portion of the pad supporting rod 64. The annular pressure receiving projection 65 partitions a downward pressure chamber 61a connected to the fluid supply port 61 for moving the pad downward from an upward pressure chamber 62a connected to the fluid supply port 62 for moving the pad upward between the inner peripheral surface of the pad supporting cylinder 60 and the outer peripheral surface of the pad supporting rod 64.

The pad supporting rod 64 is provided with a suction path 66 along the axis thereof, the lower end of which forms a bended hole 66a bended toward the suction port 63.

Figure 14A:
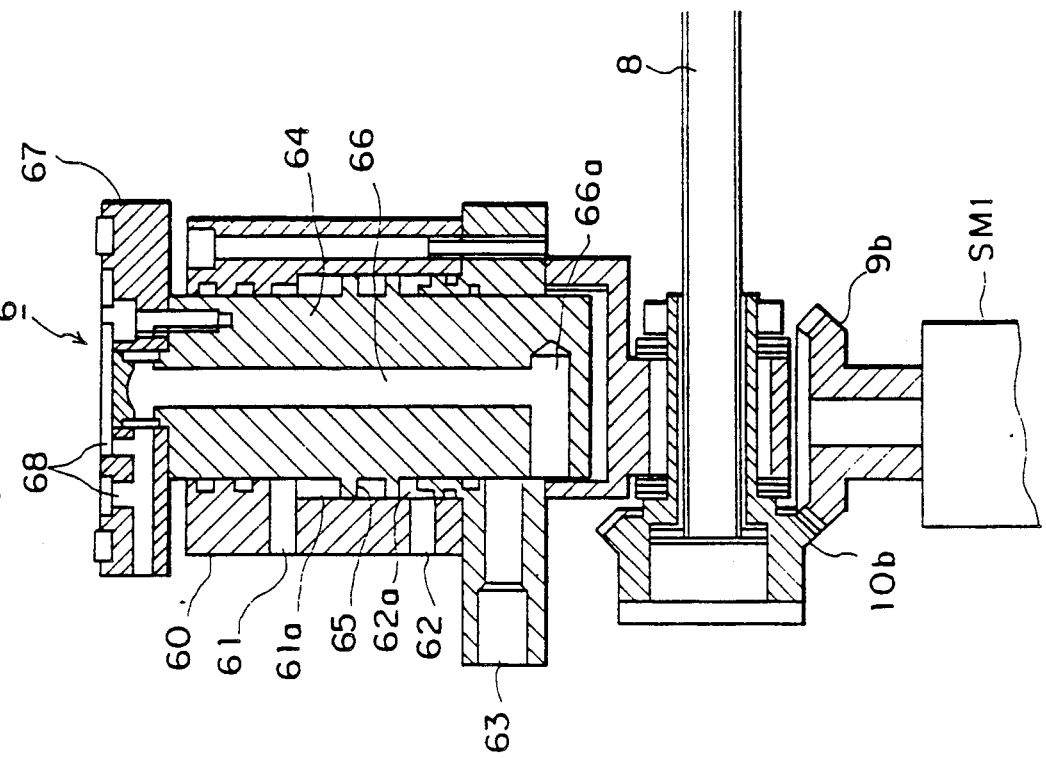
Figure 14B:
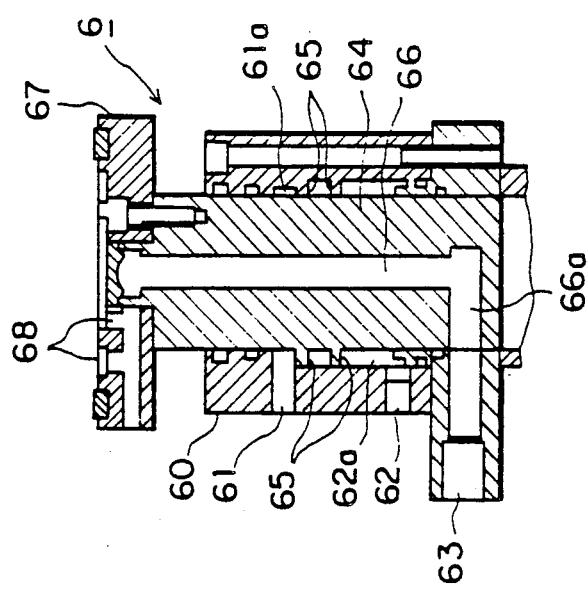

The bended hole 66a is connected to the suction port 63 at the up position of the pad supporting rod 64 as shown in FIG. 14B, while the hole 66a is moved down and displaced from the suction port 63 at the down position of the pad supporting rod 64 to be cut off from the suction port 63 as shown in FIG. 14(A). An attraction pad 67 is mounted on the upper end of the pad supporting rod 64.

The attraction pad 67 is provided with a suction opening 68 opened to an upper surface thereof, the suction opening 68 being connected to the suction path 66.

The attraction pad devices 6 are constituted as described above, and the plurality of such devices are arranged on the pad mounting units $5_1$ to $5_n$, respectively.

On the pad mounting units $5_1$ to $5_n$ are mounted Y-axis direction screw rods 8, respectively, along the longitudinal direction thereof, and the plurality of attraction pad devices 6 are threadedly engaged with the screw rods 8 (pad guide means) for reciprocating movement The pad mounting units $5_1$ to $5_n$ are threadedly engaged with the X axis direction screw rods 7. Accordingly, the attraction pad devices 6 can be reciprocated in the X- and Y-axis directions.

The attraction pad devices 6 are individually provided with servomotors SM1 and SM2. When the servomotors SM1 and SM2 are started normally or reversely, the attraction pad devices 6 are reciprocated along the screw rods 7 in the X-axis direction and the screw rods 8 in the Y-axis direction.

That is, the servomotors SM1 and SM2 shown comprise driving bevel gears 9b and 9a mounted to the output shafts and driven bevel gears 10b and 10a threadedly engaged with the X-axis direction screw rods 7 and the Y-axis direction screw rods 8 and meshed with the driving bevel gears 9b and 9a, as shown in FIGS. 14A ad 13A. In the pad mounting units $5_1$ to $5_n$, for example, in FIG. 13A, the driving bevel gear 9a of the servomotor SM2 positioned at the end is threadedly engaged with the X-axis direction screw rod as shown in FIG. 13A, and when the servomotor SM2 is started normally or reversely, the pad mounting units $5_1$ to $5_n$ are moved in the X-axis direction.

Figure 15:
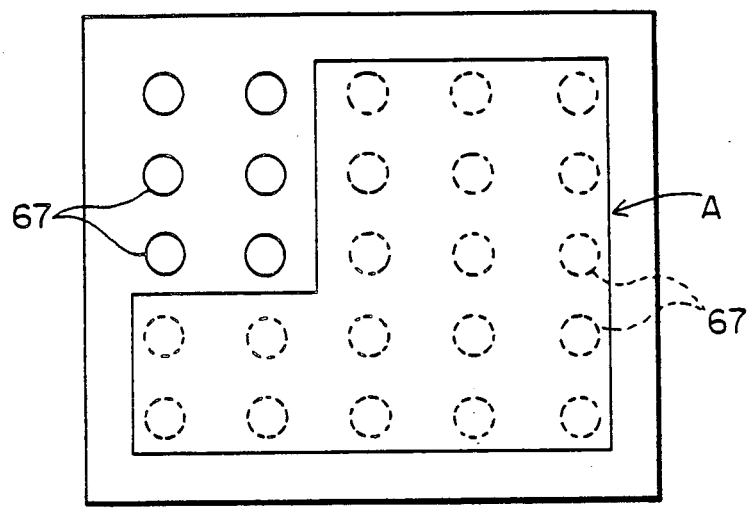
FIGS. 15, 16 and 17 are respectively plan views showing the state where materials to be processed different from each other in shape and size are placed on the attraction pads.
Figure 16:
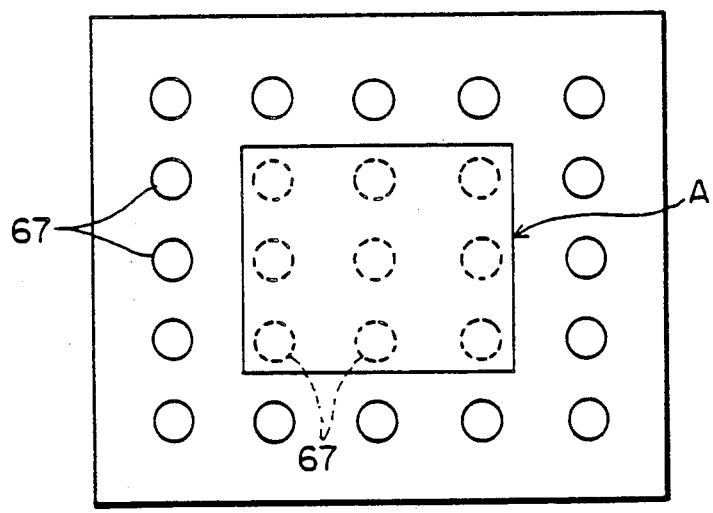

The operation will now be described. In cutting and processing of the material to be processed by the woodworking router 1, the materials to be processed A are placed on and fixed to the plurality of attraction pads 67 as shown in FIGS. 15 and 16. In this case, the materials to be processed A have a variety of sizes and shapes as shown in FIGS. 15 and 16, for example.

The servomotor SM2 for the pad mounting units $5_1$ to $5_n$ driving system is controlled and started to drive the units $5_1$ to $5_n$ along the X-axis direction screw rods 7. Thereby, the spacing between the pad mounting units $5_1$ to $5_n$ is automatically adjusted to the spacing corresponding to the size and shape of the material to be processed. At the same time, when the servomotor SM1 of the respective attraction pad devices 6 is controlled and started, the attraction pad devices 6 are driven in the Y-axis direction along the Y-axis direction screw rods 8. Thereby, the spacing between the attraction pad devices 6 in the pad mounting units $5_1$ to $5_n$ is automatically adjusted concurrently to the spacing corresponding to the size and shape of the material to be processed A.

In this manner, the attraction pad devices 6 are automatically adjusted in position along the X- and Y-axis directions, whereby the spacing between the attraction pad devices 6 corresponding to the size and shape of the material to be processed A is obtained.

As the attraction devices 6 are adjusted in position to the spacing as described above, attraction pads 67 in portions indicated by the dotted lines in FIGS. 15 and 16 attract and fix the materials to be processed A and attraction pads 67 indicated by the solid lines become of no use.

Thus, only the attraction pads 67 within the range capable of attracting the material to be processed A (the dotted line portions in FIGS. 15 and 16) are moved upward, and the remaining attraction pads 67 not capable of attracting them (the solid line portions) remain in the down. That is, in the attraction pads 67 within the range capable of attracting the materials, a pressure fluid is supplied from the fluid supply port 62 for moving upward the pad of the pad supporting cylinder 60 in that system whereby the pressure fluid flows into the pressure chamber 62a to act on the annular pressure receiving portion 65 of the pad supporting rod 64 from the bottom, and the pad supporting rod 64 moves upward. And, at that up position, the bended hole 66a of the suction path 66 of the pad supporting rod 64 is connected to the suction port 63. Because of this, the suction acts on the suction opening 68 of the attraction pad 67, and the material to be processed A is grabbed and fixed to the attraction pad 67 by said suction. In this state, cutting and processing of the material to be processed A is carried out by the cutting edge 3 of the processing head 2. Since at this cutting and processing, the attraction pads 67 which are of no use (not used) are at down positions, the pads do not interfere with the cutting and processing. In order to move the attraction pads 67 downward, a supply of pressure fluid from the upward fluid supply port is stopped whilst the pressure fluid from the downward fluid supply port 61 is supplied. Then, the pressure fluid flows into the pressure chamber for downward movement 61a, and this pressure fluid acts on the annular pressure receiving projection 65 of the pad supporting rod 64 from the top, whereby the pad supporting rod 64 is moved downward. At that down position, the bended hole 66a of the pad supporting rod 64 is displaced lower than the suction port 63 of the pad supporting cylinder 60 whereby the suction port 63 Is cut off by the pad supporting rod 64. Accordingly, the suction does not act on the downwardly positioned attraction pad 67, and in that state, the attraction pad 67 stands-by at the down position.

Figure 17B:
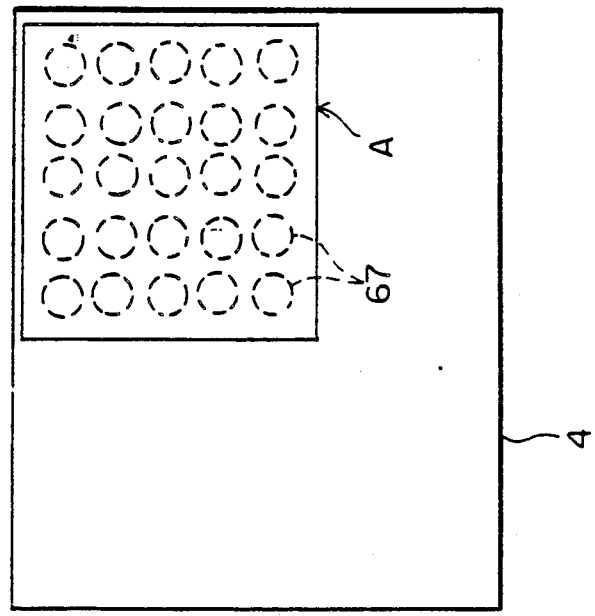
Figure 17A:
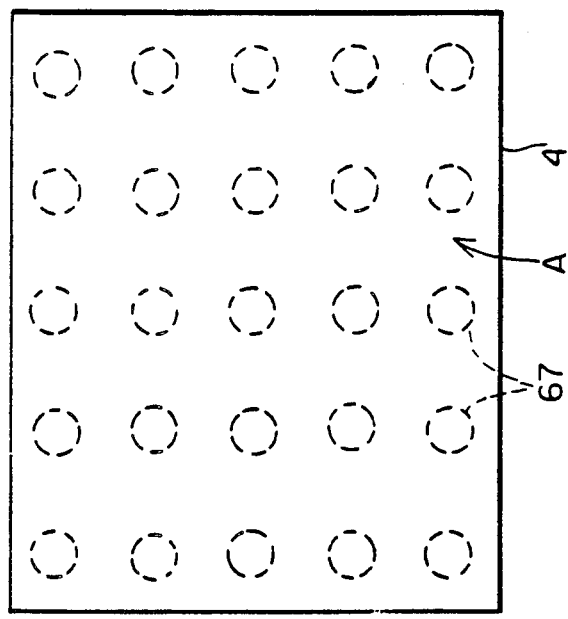

FIG. 17 shows the case where the spacing between the attraction pads 67 is changed in dependency on the size of the materials to be processed A as an example of using all attraction pads 67. FIG. 17A shows the case of a large size material to be processed A, in which case, the spacing between the attraction pads 67 is wide. FIG. 17B shows the case of a small size material to be processed A, in which case, the spacing between the attraction pads 67 is extremely narrow.

Figure 19:
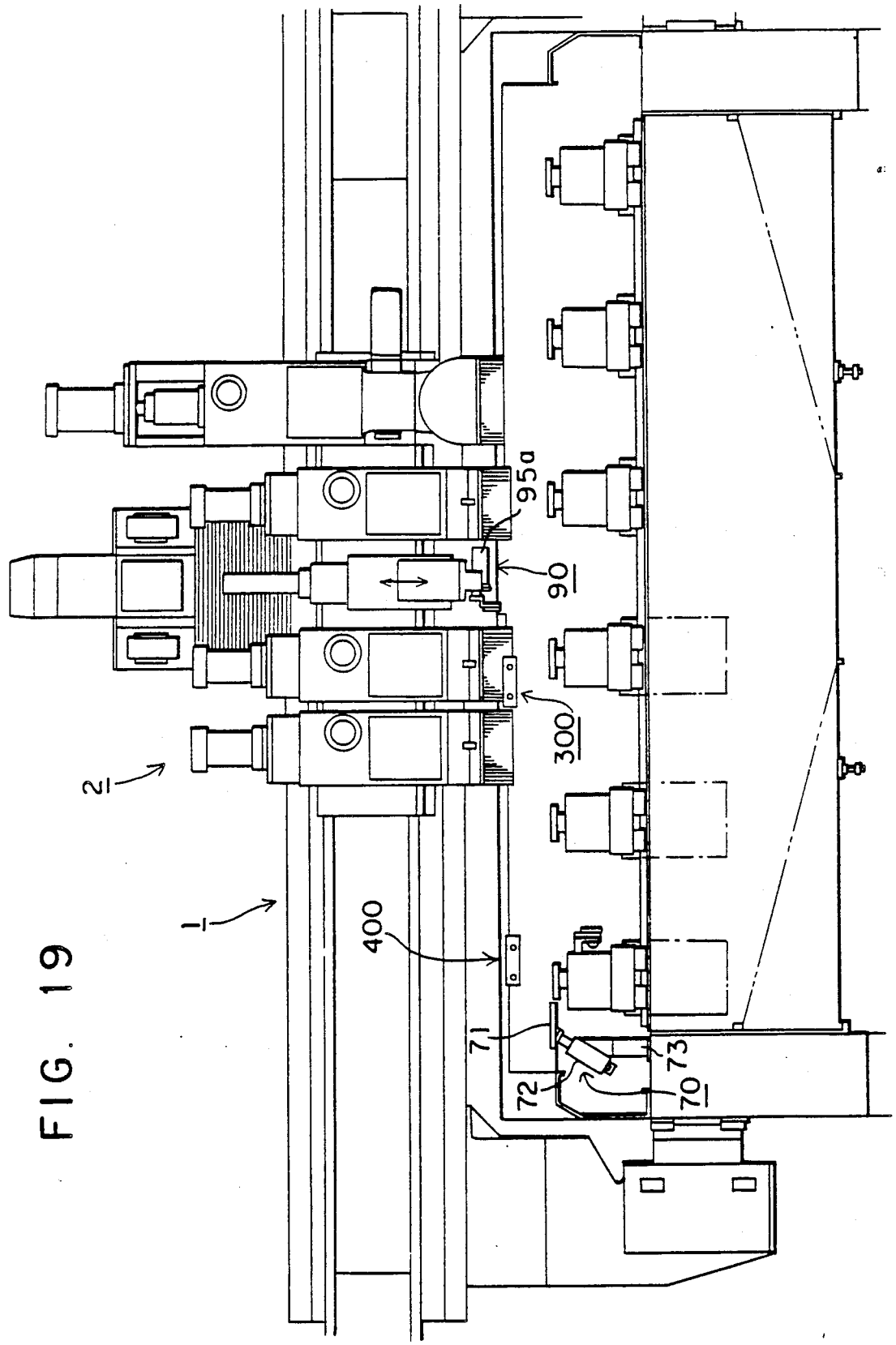
Figure 20:
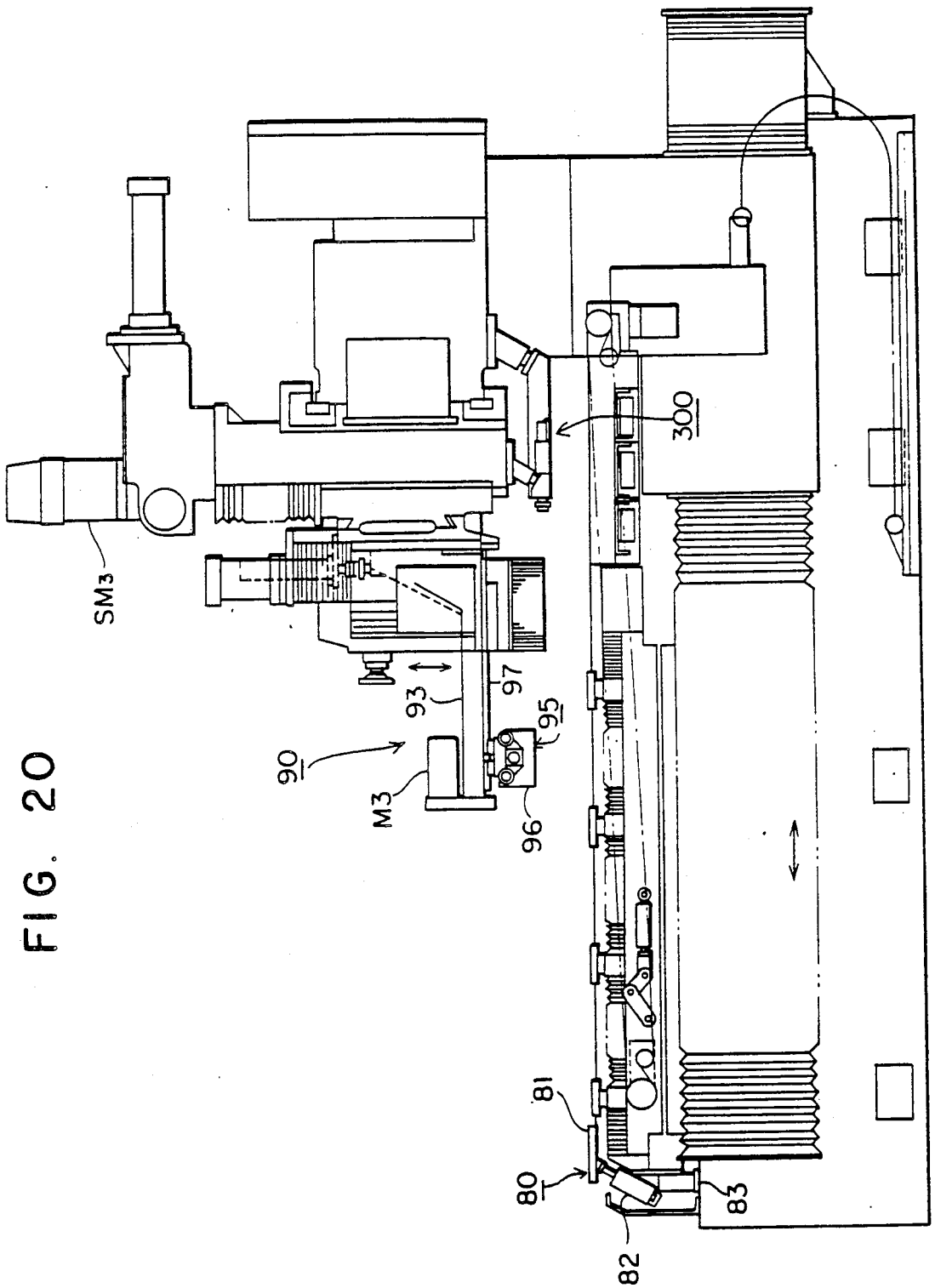

FIGS. 18 to 20 are a plan view, a front view and a side view, respectively, of the inventive lumber processing apparatus showing a positioning device for material to be processed. In these drawings, reference numeral 70 designates an X-axis direction positioning stopper, 80 a Y-axis direction positioning stopper, 90 an X-axis direction pressing means, and 300 a Y-axis direction pressing means. Reference numeral 400 designates a Y-axis direction fixing and pressing means. The positioning stoppers 70 and 80 are composed of positioning rules 71 and 81 having an abutment in contact with the material to be processed A, pneumatic cylinders 72 and 82, and fixing beds 73 and 83 for fixing the pneumatic cylinders 72 and 82. The positioning rules 71 and 81 are fixed to the extreme ends of the cylinder rods of the pneumatic cylinders 72 and 82. The positioning rules 71 and 81 appear and/or are withdrawn from the processing space S according to the operation of the pneumatic cylinders 72 and 82.

Figure 21:
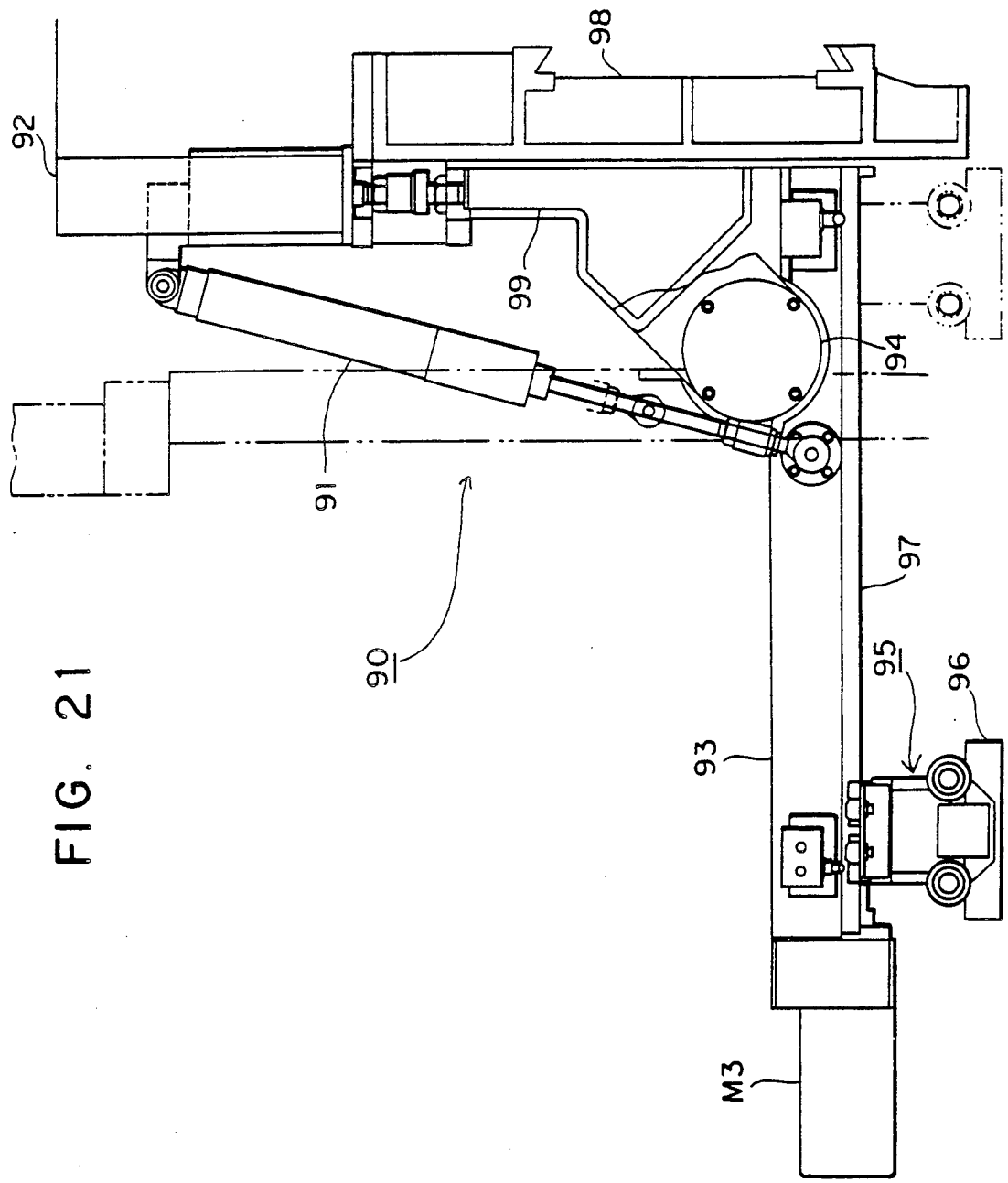
FIG. 21 is a side view showing pressing means in an X-axis direction.

FIG. 21 is a side view showing the X-axis direction pressing means. In FIG. 21, reference numeral 91 designates an arm rotating cylinder, 92 an arm moving cylinder, 93 an arm, 94 an arm rotating support point, 95 a pressing carriage, 96 a pressing plate, 97 a carriage guide rail, 98 a support post, 99 an arm supporting member, and $M_3$ a carriage moving motor.

The operation of the X-axis direction pressing means 90 will be described hereinafter.

The support post 98 is fixedly mounted on the processing head 2. The arm moving cylinder 92 is fixedly mounted integrally with the support post 98, and the arm 93 is coupled to the extreme end of the cylinder head through the arm supporting member 99. Therefore, the arm 93 is moved up and down according to the operation of the arm moving cylinder. On the other hand, the arm rotating cylinder 91 is rotatably supported on opposite sides of the arm supporting member 99, and the arm is supported on the extreme end of the cylinder rod of the arm rotating cylinder 91. Since the arm 93 is supported by the arm rotating support point 94, the arm 93 can be rotated through approximately 90° from the state extended in a horizontal direction to the approximately vertical withdrawn state. The carriage guide rail 97 is disposed at the lower end of the arm 93, and the pressing carriage 95 holds and is engaged with the carriage guide rail 97 and is movable in a longitudinal direction of the arm 93. It is moved in a longitudinal direction of the arm 93 by the carriage moving motor $M_3$ provided at the extreme end of the arm 93. The pressing plate 96 in contact with and to press the material to be processed A is mounted on the pressing carriage 95. After the material to be processed A has been placed on the attraction pad device 6, the processing head 2 with the X-axis direction pressing means 90 mounted is moved, and the pressing means 90 stops so as to be positioned in the vicinity of an external portion in the X-axis direction of the material A to be processed. Then the arm rotating cylinder 91 is operated to render the arm 93 horizontal. Thereafter, the arm moving-up cylinder 92 operates and the pressing plate 96 stops in the vicinity of the pressing position. Thereafter, fine vertical adjustment of the X-axis direction pressing means 90 is made by the 2-axis servomotor SM3 shown in FIG. 20 to set the optimum position of the pressing plate 96. The pressing carriage 95 is also moved according to the shape and size of the material to be processed to set the position. After the optimum position of the pressing plate 96 has been determined, the pressing plate 96 is moved in the X-axis direction by the X-axis direction cylinder 95a to press and position the material to be processed A in the X-axis direction.

Figure 22:
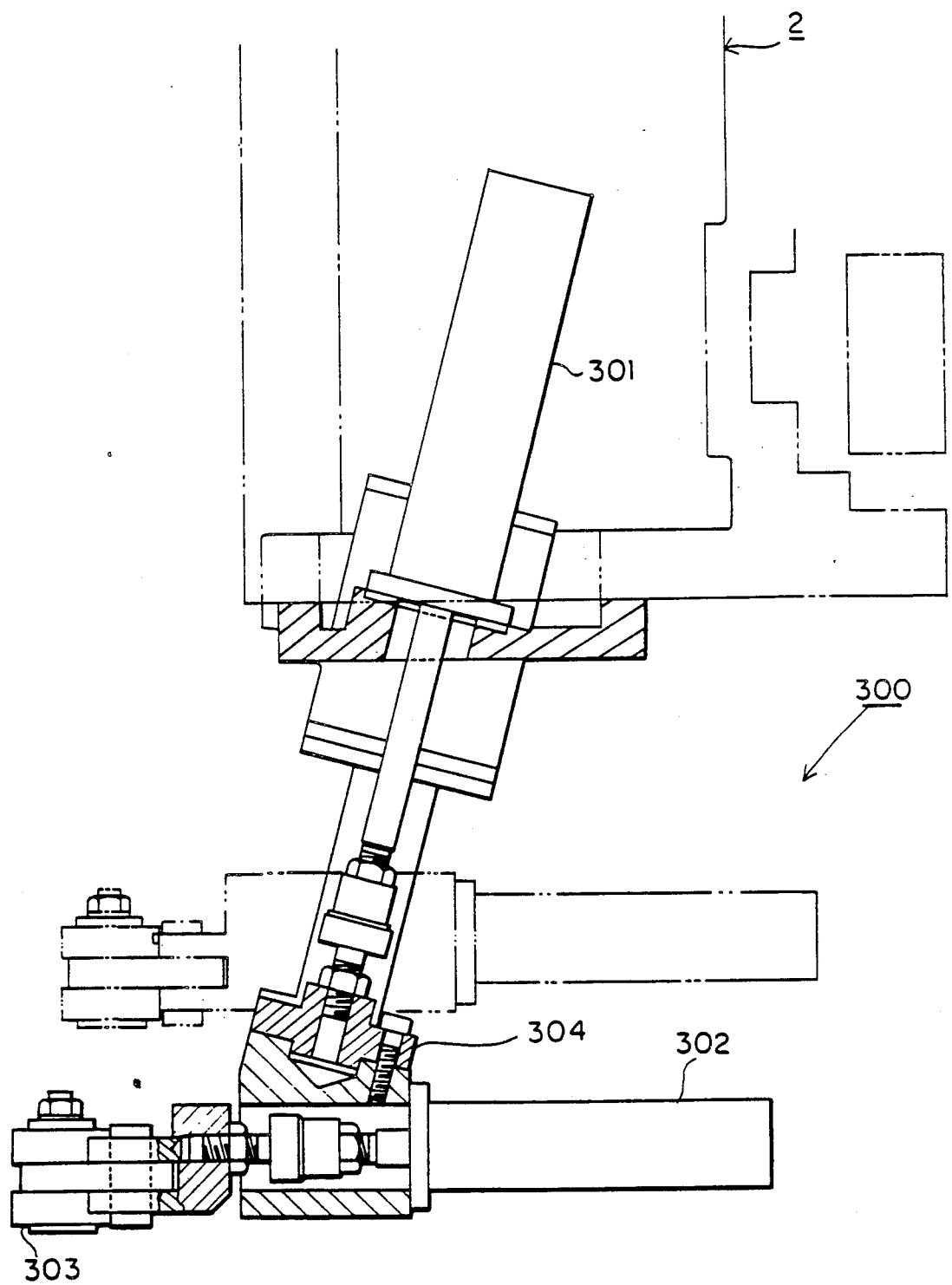
FIG. 22 is a side view showing pressing means in a Y-axis direction.

FIG. 22 is a side view showing the Y-axis direction pressing means. In FIG. 22, reference numeral 301 denotes a down cylinder fixedly mounted below the processing head 2, 302 a horizontal pressing cylinder, 303 a pressing member, an 304 a cylinder connecting block. The down cylinder 301 and the horizontal pressing cylinder 302 are connected by the cylinder connecting block 304. A vertical down position of the pressing member 303 is constant and is always set to position capable of pressing the material to be processed A.

Figure 23:
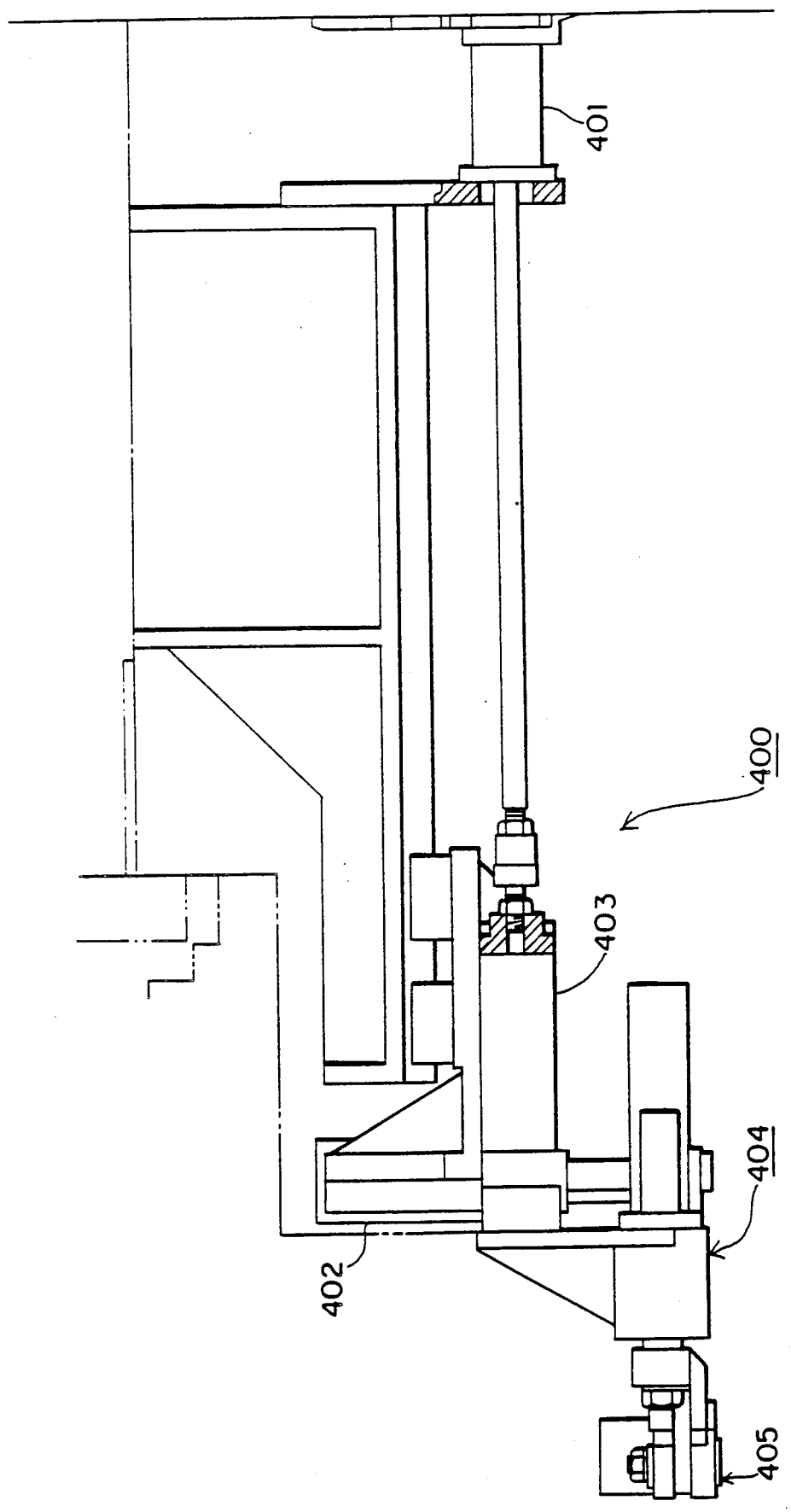
FIG. 23 is a side view showing fixed pressing means in a Y-axis direction.

FIG. 23 is a side view showing the Y-axis direction fixing and pressing means. In FIG. 23, reference numeral 401 designates a pressing cylinder, 402 an up cylinder, 403 a coupling block, 404 a pressing head, and 405 a pressing portion. The pressing cylinder 401 is fixedly mounted on a gantry portion of the apparatus body. The coupling block 403 for connecting the up cylinder 402 is secured to the extreme end of the cylinder rod of the pressing cylinder 401 to connect the up cylinder 402 with the pressing bead 404 secured thereto. The material to be processed A is pressed in the Y-axis direction by the pressing member 405 mounted on the extreme end of the pressing head 404. The height of the pressing member 405 from the processing sur face is constant to be determined by the stroke of the up cylinder 402 similar to the pressing member 303.

Figure 24:
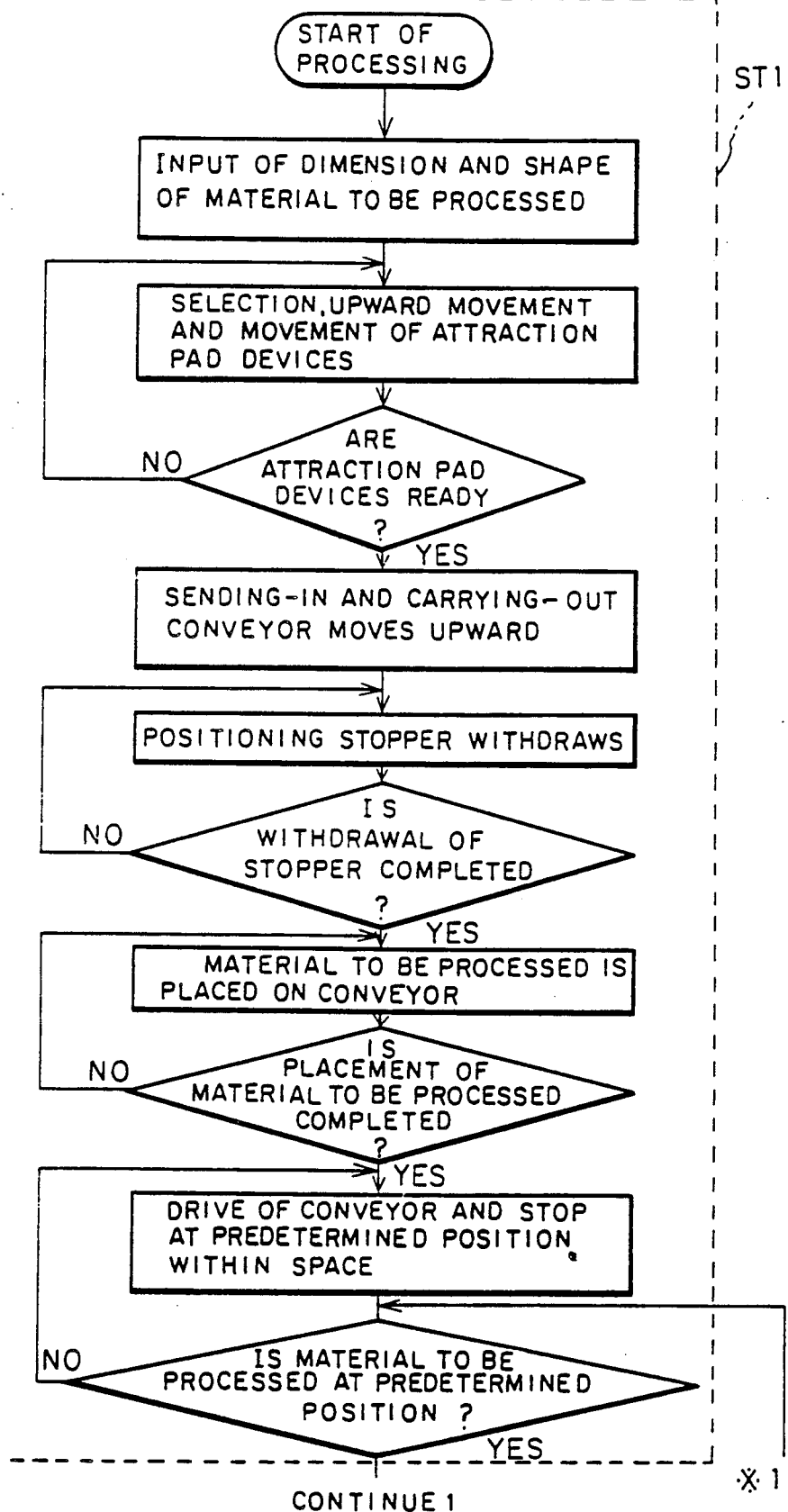
FIGS. 24(a)-24(c) are flow charts showing the operation of processing material to be processed.
Figure 24B:
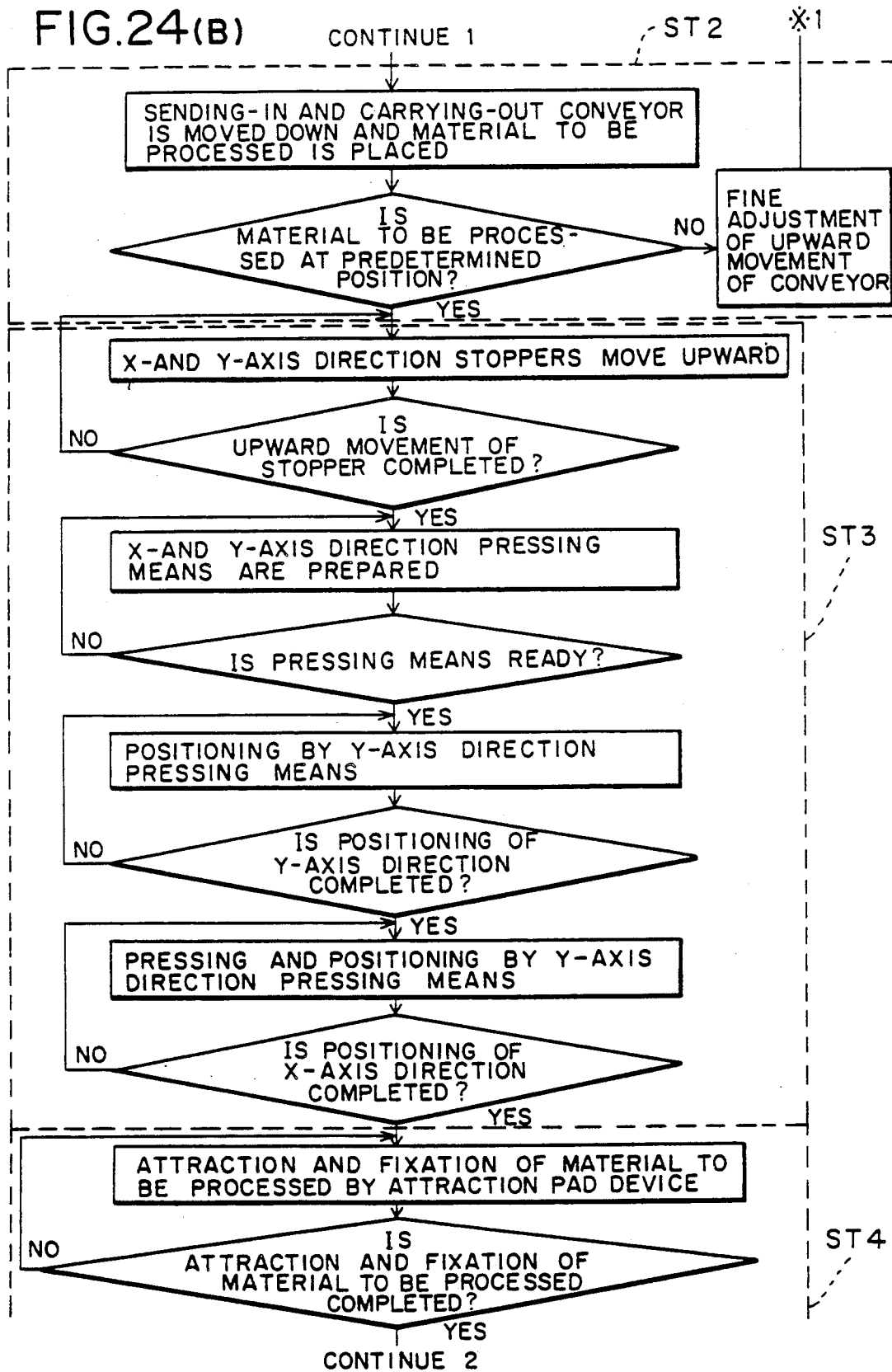

FIGS. 24A, 24B and 24C are respectively flow charts used in the processing the material to be processed A. These flow charts show examples of operation in the case where automatic processing of the material to be processed is carried out by the processing method and apparatus for the material to be processed in the lumber processing apparatus according to this invention.

The operation will be described hereinafter with reference to these flow charts.

First, the size and shape of the material to be processed are inputted into a CAD (Computer Aided Design) system for preparing a cutting program of a processing and control device described later. Optimum selection, upward movement and movement data of the attraction pad devices and processing data thereof are formed by the inputted shape and size. These data are inputted into the CPU of the processing and control device in the apparatus while either on-line or off-line. The CPU supports selection, upward movement and movement of the pad devices used for the control circuit of the attraction devices 6. Upon confirmation of the fact that the attraction pad devices 6 are ready, the sending in and carrying-out conveyor 200 is moved upward At this time, assurance is made of the state where no obstacle is present on the place surface of the material to be processed substantially formed by the upper end of the attraction pads 67 of the attraction devices 6. As one example, the positioning stopper is mentioned. Next, the material to be processed A is retrieved and placed on the carrier surface of the sending and carrying-out conveyor 200. At this time, for example, the materials to be processed A with code numbers such as bar codes associated therewith are stored in the storage area 601. The robot device selects the designated material to be processed A according to the code number read from the bar code carries it out and places it on the conveyor 200 to achieve automation. Upon assurance of the fact that the material to be processed A is completely placed on the carrier surface, the motor $M_2$ is normally driven to carry the material A into the processing space S. The processing head or the Y-direction pressing means is moved downward in advance in accordance with data inputted in the CAD system and stands-by at a predetermined position to detect the material to be processed A. A proximity switch NS is provided as detection means. Upon assurance of the fact that the material to be processed A has reached a predetermined position, the motor $M_2$ is stopped (ST 1). The sending-in and carrying-out conveyor 200 is moved down to place the material to be processed A on the attraction device 6. Assurance is made that the placing position is proper. The placing position is detected by the proximity switch NS (ST 2). Next, the X- and Y-axis direction positioning stoppers 70 and 80 are moved upward to be in the processing space S. Upon assurance of completion of movement of the stoppers 70 and 80, the withdrawn state is released so that the X-axis direction pressing means can be operated. Assurance is made of the fact that the operation can be made. The Y-axis direction pressing means 300 is first operated to press the material to be processed A in the Y-axis direction. Upon assurance by a sensor of the fact that the material to be processed A is positioned between the Y-axis direction positioning stopper 80 and the Y-axis direction pressing means 300, the material is pressed in the X-axis direction by the X-axis direction pressing means 90. Assurance is made by the sensor of completion of pressing positioning (ST 3). Next, the attraction devices 6 are operated to attract and fix the material to be processed A. Upon assurance by a vacuum switch of upward movement of vacuum pressure and completion of attraction and fixation, the X- and Y-axis direction pressing means 90 and 300 are withdrawn. After assurance of completion of withdrawal, the processing cycle is started by a program prepared by the CAD system in advance and transferred to the NC device (In the case where the three dimensional downward movement by the processing head extends to the X- and Y-axis direction positioning means 70 and 80, both the means 70 and 80 are withdrawn). Assurance is made by a processing completion signal delivered from the NC device of completion of processing cycle (ST 4). Attraction of the attraction pad devices 6 is released. Upon assurance of release of attraction, the sending-in and carrying-out conveyor 200 is moved upward. Then, the X- and Y-axis direction positioning stoppers 70 and 80 are withdrawn, which is then confirmed, and the motor $M_2$ of the conveyor 200 is normally or reversely operated to carry out the processed product (ST 5). Thereafter, processing may be continuously carried out or the apparatus may be stopped. The processed products are received by the aforementioned device such as the robot device and stored in the storage area 601 or the stockyard 615.

Figure 25:
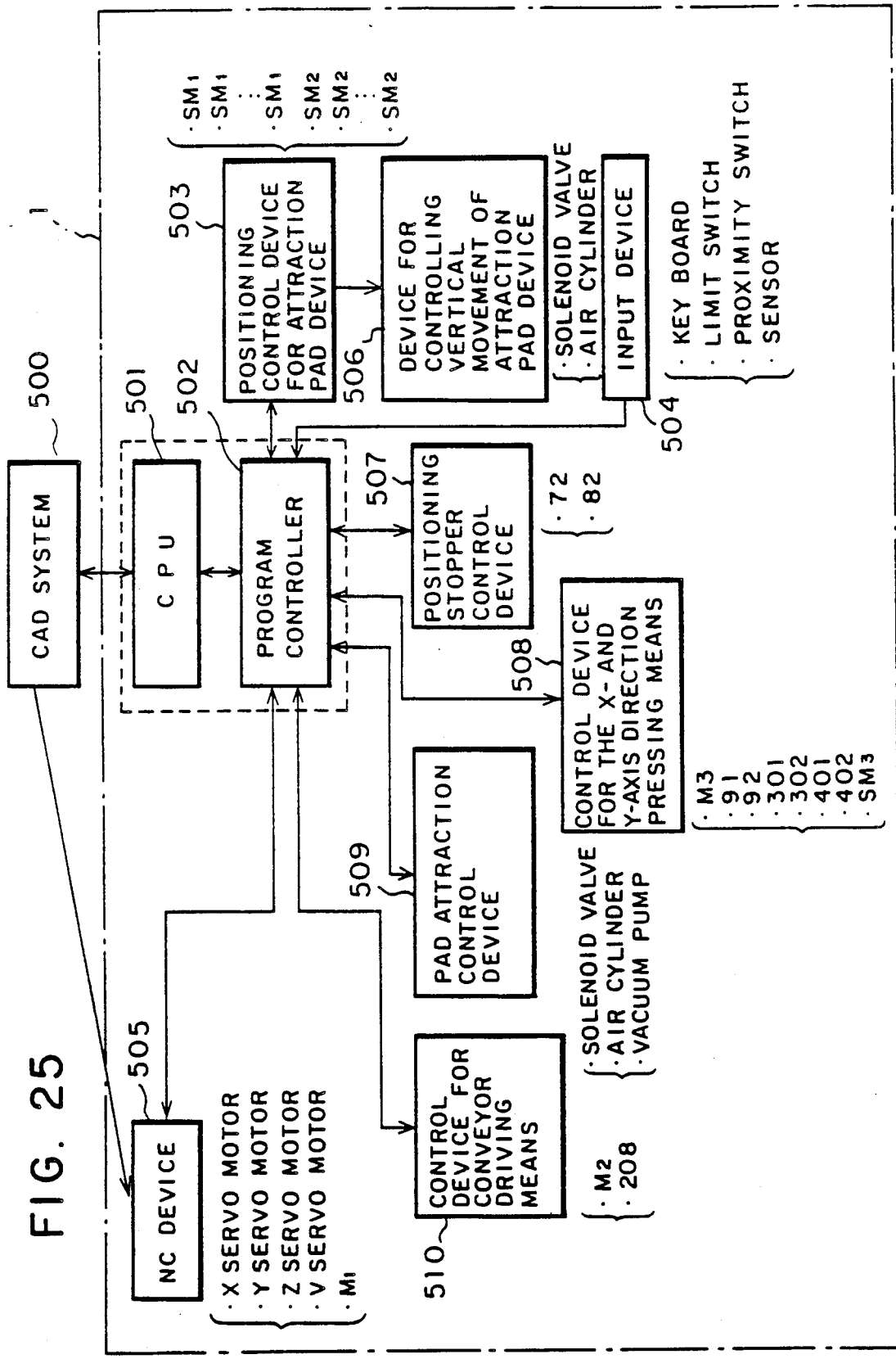
FIG. 25 is a systematic view of a processing control device in this embodiment.

FIG. 25 is a systematic view of the processing and control device in this embodiment. In FIG. 25, reference numeral 500 designates a CAD system capable of connection to the woodworking router 1, 501 a CPU which corresponds to the aforementioned control device 618, 502 a program controller for controlling the inputting of instructions to CPU 501, 504 an input device on the side of the lumber processing apparatus 1. It is noted that the CAD system 500 is separately provided with an input device. Reference numeral 505 designates an NC device for controlling the processing of lumber, 506 a device for controlling vertical movement of the attraction pad devices, 507 a positioning stopper control device, 508 a control device for the X- and Y-axis direction pressing means, 509 a stopper attraction control device, and 510 a control device for the conveyor driving means. A plurality of program controllers are incorporated according to the purposes of the apparatus.

The operation will be described hereinafter. The CAD system 500 prepares a cutting program for obtaining the desired processed products. When the shape and size of the materials to be processed are inputted into the CAD system, the processing data for the processing head and the optimum data in relation to the selection, upward movement and movement of the attraction pad devices are formed. The CAD system is connected to the CPU 501 on the side of the woodworking router 1 and the NC device 505 through data buses so that the on-line operation may be effected, and the CAD system may be disconnected therefrom so that the off-line operation may be effected.

The positioning control device 503 of the attraction pad devices encases therein a microcomputer so that 10 shafts may be positioned simultaneously in accordance with the instructions of the CPU 501 and the program controller 502 on the basis of the CAD system 500, and 300 shafts in all can be positioned. Calculation is carried out on the basis of input values so that simultaneous positioning may be made without mutual interference of the shafts, and the positioning order within a block for every 4 shafts is automatically determined to effect positioning.

The instructions of the CPU 501 inputted from the program controller 502 are transmitted to the driving means through the control means 503 to 510 to operate the former. The input device 504 is supplied with various information by limit switches, proximity switches and various sensors arranged suitably on the woodworking router 1, in addition to the keyboard. This embodiment employs a sequence control system in which a processing step, or each processing operation within the step confirms termination of previous operation and moves to next operation, and movement to automation is simply carried out.

As described above, according to this embodiment, the materials to be processed are placed in predetermined positions of the processing space by the sending-in and carrying-out conveyor provided in the woodworking router and which is capable of rapid movement in the processing space of said router, the materials to be processed are positioned and fixed suitably and by a powerful attraction force by the attraction pad devices which substantially form place beds for the materials to be processed, the materials to be processed are positioned by positioning means capable of appearing in and being withdrawn from the processing space and fixed, and thereafter said means is withdrawn. Therefore, the steps can be continuously controlled, and the processing control device for collectively controlling these steps is provided to achieve automation.

Furthermore, exclusive-use attraction jigs adjusted to the shape and size of the material to be processed are not required, and the steps required to fabricate the jigs, the space for storage, the steps for changing the jigs and the like are not at all required. In positioning and fixing the materials to be processed, an extra clamping allowance of material is not necessary, and therefore, less material is wasted.

In this manner, the steps before processing by the woodworking router, a processing step of the woodworking router and steps after the processing can be all carried out automatically. Operating efficiency can be improved materially as compared with prior art. Operation can be almost unmanned. Mis-operation can be eliminated to improve quality of products. There are further advantages in that by use of the direction changing conveyor, layouts of various parts can be freely changed and that utilization of a space for working rooms can be effectively made.

What is claimed is:

1. A lumber processing apparatus, comprising:
   carriage means for selecting and removing materials to be processed by the apparatus from a storage area and transferring said materials to a predetermined supply position, and for receiving processed products from a predetermined receiving position and for transferring said processed products to preselected storage locations;
   a woodworking router for processing said materials, including adjustable positioning means for properly positioning and fixing said materials for processing according to the size and shape thereof;
   a sending conveyor for conveying said materials to said woodworking router;
   first transferring means for transferring materials from said predetermined supply position to said sending conveyor;
   a receiving conveyor for conveying processed products from said woodworking router to said predetermined receiving position;
   second transferring means for transferring said processed products from said predetermined receiving position to said carriage means; and
   controller means for controlling the operation of said carriage means, said first and second transferring means, said woodworking router, and said sending and receiving conveyors.

2. A lumber processing apparatus according to claim 1, further comprising a supply table lifter located at said predetermined supply position having a vertically movable surface for holding said materials to be processed from said carriage means, and lifter means for vertically moving said surface to enable said material to be transferred to said sending conveyor by said first transferring means.

3. A lumber processing apparatus according to claim 1, wherein said woodworking router comprises:

a processing head including a cutting edge for processing said material and a processing space for accommodating said material to be processed by said cutting edge; and said adjustable positioning means includes a plurality of attraction devices arranged in a plane of said processing space and being movable in X- and Y-axis directions of said plane, said attraction devices including attraction surfaces collectively forming a fixing surface for forcibly attracting and fixing said materials to be processed, conveyor means capable of entering and withdrawing from said processing space for conveying materials to said processing space from said sending conveyor, and for conveying processed products from said processing space to said receiving conveyor, positioning stopper means capable of entering and withdrawing from said processing space for abutting against respective ends of said materials in the X- and Y-axis directions at predetermined positions in said processing space as said materials are conveyed thereinto by said conveyor means, and pressing means capable of entering and withdrawing from said processing space for pressing said materials against said attraction surfaces for fixing said materials to said attraction surfaces at predetermined positions according to the size and shape of said materials being conveyed into said processing space; and a processing controller for controlling operation of said processing head, said attraction devices, said conveyor means, said position stopper means, and said pressing means.

4. A lumber processing apparatus according to claim 3, wherein said attraction devices include independent driving means for moving said attraction devices in the X- and Y-axis directions of said plane in response to instruction from said processing controller in accordance with the size and shape of said materials.

5. A lumber processing apparatus according to claim 3, wherein said conveyor means includes a conveyor and reversible driving motor for selectively driving said conveyor in either a forward or backward direction for conveying said materials into and out of said woodworking router.

6. A lumber processing apparatus according to claim 1, further comprising a receiving table lifter located at said predetermined receiving position having a vertically movable surface for holding said processed products from said receiving conveyor, and lifter means for vertically moving said surface to enable said processed products to be transferred to said carriage means by said second transferring means.

7. A lumber processing apparatus according to claim 1, wherein said receiving conveyor comprises a direction change conveyor capable of changing the conveying direction of materials or processed products carried thereon from a first direction to a second direction orthogonal to said first direction.

8. A lumber processing method for processing materials in a woodworking router, comprising the steps of:

automatically selecting and removing materials to be processed from a storage area and transferring said materials to a predetermined supply position, and automatically receiving processed products from a predetermined receiving position and transferring said processed products to preselected storage locations, by using a carriage means, conveying said materials to said woodworking router with a sending conveyor;

transferring materials from said predetermined supply position to said sending conveyor;

conveying processed products from said woodworking router to said predetermined receiving position;

transferring said processed products from said predetermined receiving position to said carriage means; and automatically controlling the steps of selecting, removing, transferring and conveying.

9. A lumber processing method according to claim 8, wherein said woodworking router comprises:

a processing head including a cutting edge for processing said material and a processing space for accommodating said material to be processed by said cutting edge; and said method further includes the steps of conveying said materials to be processed into said processing space, stopping conveying motion of said materials by abutting against respective ends of said materials in the X- and Y-axis directions at predetermined positions in said processing space as said materials are conveyed thereinto, pressing said materials against said attraction surfaces for fixing said materials to attraction surfaces of a plurality of movable attraction devices at predetermined positions according to the size and shape of said materials being conveyed into said processing space, and forcibly attracting and fixing said materials to be processed within said processing space through said plurality of movable attraction devices.

* * * * *

UNITED STATES PATENT AND TRADEMARK OFFICE
CERTIFICATE OF CORRECTION

PATENT NO. : 5,094,282

DATED : March 10, 1992

INVENTOR(S) : Yukitomo Suzuki et al.

It is certified that error appears in the above-identified patent and that said Letters Patent is hereby corrected as shown below:

Col. 1, line 49 "Z" should be --2--.

Col. 2, line 36 "like" should be --like.--.

Col. 2, line 68 "lifter" should be --lifter.--.

Col. 5, line 23 after "arrow" insert --$\underline{a}$--.

Col. 7, line 18 "Z" should be --2--.

Col. 8, line 21 "carrying out" should be --carrying-out--.

Col. 8, line 28 "wood" should be --wood- --.

Col. 8, line 58 "y-axis" should be --Y-axis--.

Col. 8, line 64 "an" should be --a--.

Col. 9, line 59 "material-to be" should be --material-to-be--.

Col. 9, line 67 "Is" should be --is-- and "In" shoud be --in--.

Col. 10, line 22 "downward" should be --upward--.

Col. 10, line 65 "ment" should be --ment.--.

Col. 11, line 16 after "rod" insert --7--.

UNITED STATES PATENT AND TRADEMARK OFFICE
CERTIFICATE OF CORRECTION

PATENT NO. : 5,094,282

DATED : March 10, 1992

INVENTOR(S) : Yukitomo Suzuki et al.

It is certified that error appears in the above-identified patent and that said Letters Patent is hereby corrected as shown below:

Col. 11, line 58 after "down" insert --position--.

Col. 12, line 21 "Is" should be --is--.

Col. 13, line 28 "2-axis" should be --Z-axis--.

Col. 13, line 57 "bead" should be --head--.

Col. 13, line 61 "sur face" should be --surface--.

Col. 14, line 18 "sending in" should be --sending-in--.

Col. 14, line 25 "sending" should be --sending-in--.

Signed and Sealed this

Twelfth Day of October, 1993

Attest:

BRUCE LEHMAN

Attesting Officer

Commissioner of Patents and Trademarks